United States Patent
Mohammad et al.

(10) Patent No.: US 8,081,753 B2
(45) Date of Patent: Dec. 20, 2011

(54) HYBRID ECHO CANCELLER CONTROLLERS

(75) Inventors: Asif Iqbal Mohammad, Rolla, MO (US); Jack W. Stokes, III, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1294 days.

(21) Appl. No.: 11/695,440

(22) Filed: Apr. 2, 2007

(65) Prior Publication Data

US 2008/0240414 A1 Oct. 2, 2008

(51) Int. Cl.
*H04M 9/08* (2006.01)
(52) U.S. Cl. ......... 379/406.08; 379/406.04; 379/406.13; 379/406.14
(58) Field of Classification Search ............ 379/406.01, 379/406.04, 406.06, 406.08, 406.05, 388.01; 381/19, 20
See application file for complete search history.

(56) References Cited

U.S. PATENT DOCUMENTS

| | | | |
|---|---|---|---|
| 6,687,723 B1 * | 2/2004 | Ding | 708/322 |
| 6,996,229 B2 * | 2/2006 | Gunther | 379/406.06 |
| 7,003,099 B1 * | 2/2006 | Zhang et al. | 379/406.03 |
| 7,177,416 B1 * | 2/2007 | Zhang et al. | 379/387.01 |
| 2002/0154761 A1 * | 10/2002 | McLaughlin et al. | 379/388.01 |
| 2005/0276420 A1 * | 12/2005 | Davis | 381/20 |
| 2007/0058799 A1 * | 3/2007 | Sudo | 379/406.01 |
| 2008/0075269 A1 * | 3/2008 | Raifel et al. | 379/406.01 |

OTHER PUBLICATIONS

Jung, Hae Kyung et al., a new double-talk detector using echo path estimation, Sep. 5, 2004, Speech Communication, 45 (2005) 41-48.*

Jung, Hae Kyung et al., a new double-talk detector using echo path estimation, Sep. 5, 2004, Speech Communication, 45 (2005) 41-48.*

S. Haykin. Adaptive Filter Theory, Prentice Hall, Englewood Cliffs, NJ, 1991. Last accessed Jan. 31, 2007, 2 pages.

Hua Ye, et al. "A new double-talk detection algorithm based on the orthogonality theorem," IEEE Trans. on Comm., vol. 39, pp. 1542-1545, Nov. 1991. Last accessed Dec. 26, 2006, 4 pages.

B. Porat. "Second-order equvalence of rectangular and exponential windows in least-squares estimation of autoregressive processes," IEEE Trans. On Acoustics, Speech and Signal Processing, vol. ASSP-33, No. 4, Oct. 1985 http://ieeexplore.ieee.org/iel6/29/26193/01164685.pdf?tp=&arnumber=1164685&isnumber=26193. Last accessed Jan. 7, 2008, 4 pages.

Mohammad Asif Iqbal, et al. "Doubletalk detection using real time recurrent learning," in IWAENC, Paris, France, Sep. 2006. http://research.microsoft.com/~acsuren/doubletalk.pdf. Last accessed Jan. 7, 2008, 5 pages.

Benesty, et al. "A new class of doubletalk detectors based on crosscorrelation," IEEE Trans. on Sp. and Au. Proc., vol. 8, pp. 168-172, Mar. 2000. S1063-6676(00)01723-5. Last accessed Dec. 26, 2006, 5 pages.

(Continued)

*Primary Examiner* — Fan Tsang
*Assistant Examiner* — Jeffrey Lytle
(74) *Attorney, Agent, or Firm* — Lee & Hayes, PLLC

(57) ABSTRACT

Hybrid echo canceller controllers are described herein. By way of example, a system for controlling an echo canceller can include a signal indicator and an echo canceller controller. The signal indicator can be configured to indicate periods of near-end signal and to indicate periods of echo only with echo-path change in the corrupted signal based at least in part on cross-correlation between two signals associated with the echo canceller. The echo canceller controller can be configured to control the echo canceller according to indications from the signal indicator.

17 Claims, 35 Drawing Sheets

OTHER PUBLICATIONS

Surendran, et al. "Logistic discriminative speech detectors using posterior snr," in Proceedings of the 2004 IEEE ICASSP, Montreal, Canada, May 2004, pp. 625-628. Last accessed Dec. 26, 2006, 4 pages.

Cutler. "The distributed meetings system," in Proceedings of the 2003 IEEE ICASSP, Hong Kong, China, Apr. 2003, pp. 756-759. 0-7803-7663-3/03. Last accessed Dec. 26, 2006, 4 pages.

Martin. "Spectral subtraction based on minimum statistics," in Proceedings of the 7th European Signal Processing Conference, Edinburgh, Scotland, Sep. 1994, pp. 1182-1185. Last accessed Dec. 26, 2006, 4 pages.

Cho, et al. "An objective technique for evaluating doubletalk detectors in acoustic echo cancelers," IEEE Trans. on Sp. and Au. Proc., vol. 7, pp. 718-724, Nov. 1999. Last accessed Dec. 26, 2006, 7 pages.

Bishop. Neural Networks for Pattern Recognition. Oxford University Press.

Cohen, et al. Speech enhancement for non-stationary noise environments. In Signal Processing 81, pp. 2403-2418, 2001. Last accessed Dec. 26, 2006, 16 pages.

Pearce, et al. The aurora experimental framework. In Proceedings of the 6th International Conference on Spoken Language Processing, pp. 16-20, Beijing, China, Oct. 2000. Last accessed Dec. 26, 2006, 4 pages.

* cited by examiner

HYBRID ECHO CANCELLER CONTROLLERS

CROSS-REFERENCE TO RELATED APPLICATIONS

This application is related to U.S. patent application Ser. No. 11/695,426, entitled CROSS-CORRELATION BASED ECHO CANCELLER CONTROLLERS, filed on Apr. 2, 2007, and U.S. patent application Ser. No. 11/695,447, entitled HYBRID ECHO CANCELLER CONTROLLERS, filed on Apr. 2, 2007.

BACKGROUND

Acoustic echo cancellation (AEC) algorithms are used to suppress the echo from a loudspeaker(s) that can be captured by a microphone(s) located in close proximity. Typically, AEC is used during full-duplex communication between someone located in a near-end room speaking with another person located remotely in a far-end room. When the far-end person speaks, their voice is played through the speakers in the near-end room. The echo from the far-end person's speech is then captured by the near-end microphone(s). Without AEC, the far-end speech echo would be transmitted back to the far-end and the far-end person would hear a delayed echo of their previous speech out of the speakers in the far-end room.

When far-end speech is played from loudspeakers located in the near-end room simultaneously when there is near-end speech, the condition is commonly referred to as doubletalk. If the coefficients for the AEC's adaptive filters are updated when there is any near-end speech or other transient acoustic signal in the near-end room or when there is doubletalk, the adaptive filters will converge in such a manner as to cancel part of the near-end speech in addition to the echo from the loudspeaker. Cancellation of the near-end speech leads to distortion of the processed speech signal and should be avoided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein facilitates controlling the performance of an echo canceller (EC), for instance an acoustic echo canceller (AEC) or a line echo canceller (LEC). By way of example, the subject matter includes controllers that cross-correlate a microphone signal and the EC's error signal in order to control the adaptation of the EC. By way of another example, the subject matter described herein includes controllers that combine cross-correlation with techniques to discriminate near-end signal from echo in order to control the adaptation of the EC. The cross-correlation measure can include, for instance, a measure based on cross-correlating the microphone signal and the EC's cancellation error signal. By way of another example, the subject matter described herein also includes controllers that employ two or more cross-correlation measures in order to control the adaptation of an EC.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents. Although the drawings illustrate the specific environment for an AEC, the subject matter described herein is applicable to any EC, including line echo cancellers (LEC).

DETAILED DESCRIPTION

Although the subject matter described herein may be described in the context of teleconferencing, acoustic echo cancellation and line echo cancellation, the subject matter is not limited to these applications. Rather, the signals to be detected and the signals to be cancelled include any suitable type of signal such as music or sounds from video games.

Figure 1:
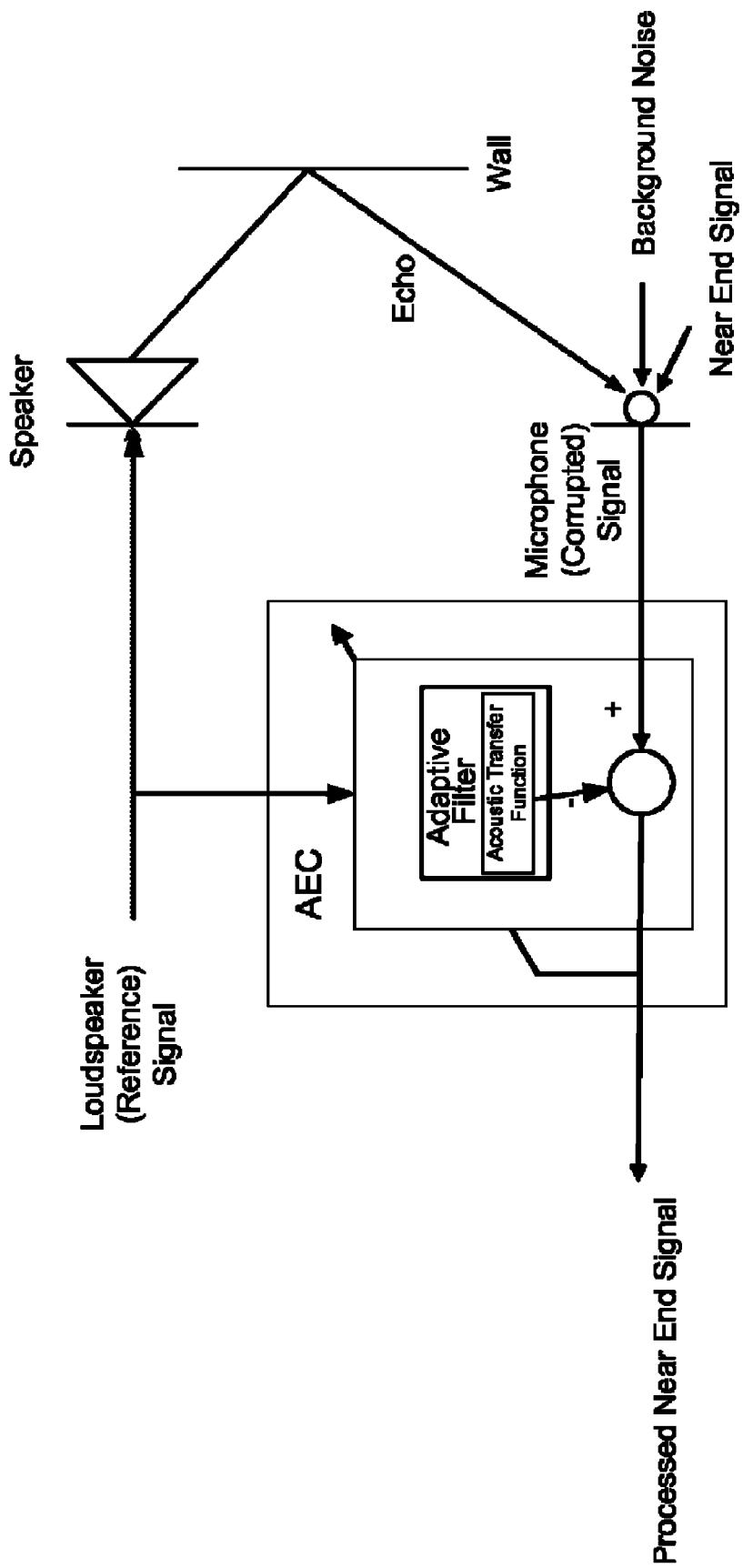
FIG. 1 schematically illustrates an echo canceller (EC) implemented in the time domain.
Figure 2:
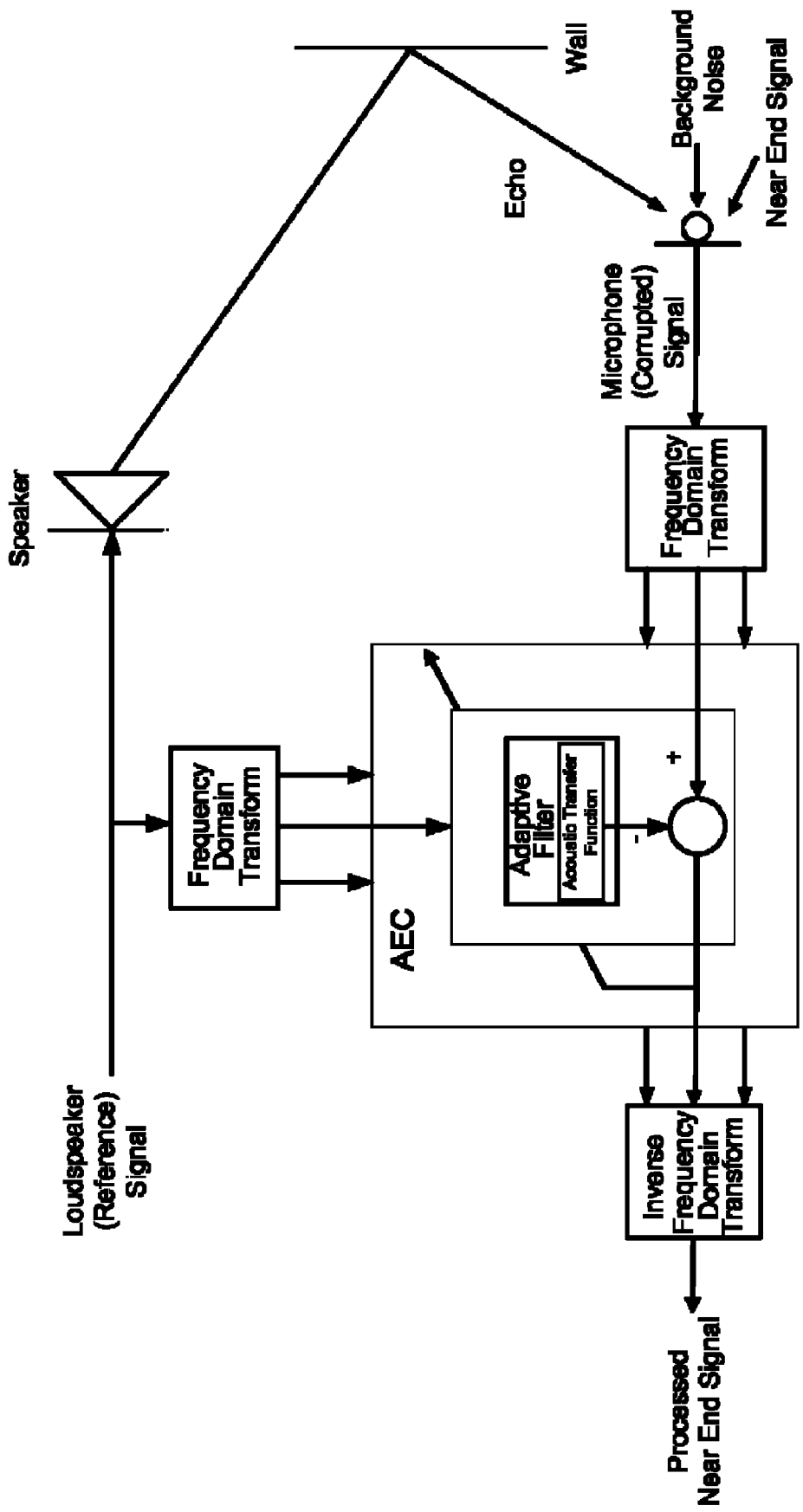
FIG. 2 schematically illustrates an echo canceller (EC) implemented in the frequency domain.

Many teleconferencing conversations are conducted in the presence of acoustic echoes. An acoustic echo canceller (AEC) can be used to remove the echo created due to the loudspeaker-microphone proximity. AEC adaptive filters can be implemented in the time domain (FIG. 1) and the frequency domain (FIG. 2). An AEC adaptively synthesizes a replica of the echo and subtracts it from the echo-corrupted microphone signal. When the near-end talker is active or when the speech comes from both the far-end and the near-end, the filter coefficients will diverge from the true echo path impulse response if adaptation is enabled. A speech detector can be used to avoid this by stopping the AEC's adaptation during periods of near-end speech. In addition, adaptation can be halted during periods when both near-end speech and echo are absent.

Similarly, line echo cancellation (LEC) algorithms can be used to suppress the echo from a microphone signal that is caused by hybrid circuits in telephone networks and telecommunication equipment. Although some of the subject matter described herein may be described in terms of acoustic echo cancellation, the subject matter also is applicable to LEC. For AEC, the signal at the microphone can be referred to as the corrupted signal, which can include near-end signal (e.g., speech) with or without echo. The loudspeaker signal in the near-end room can be referred to as the reference signal and the echo in the case of AEC is the echo from the loudspeaker sound. For LEC performed in a telecommunications device such as a telephone or video conferencing system, the signal input to the telephone speaker can be referred to as the corrupted signal, which can include sounds such as speech (near-end signal) with or without microphone echo. The microphone signal can be referred to as the reference signal. For LEC performed in the network, the reference signal is the far-end signal and the corrupted signal is the near-end signal plus the background noise and the echo generated by the far-end signal due to impedance mismatch in 2-wire/4-wire converters.

Ideally, a near-end signal detection algorithm should be able to detect a near-end signal condition quickly and accurately so as to freeze adaptation as soon as possible, track any echo-path changes and distinguish near-end signal from the echo-path variations. One example of a decision variable $\xi$ for near-end signal detection behaves as follows:

(1) If near-end signal is not present i.e. $v=0$, then $\xi \geq R_{Th}$; and (2) If near-end signal is present i.e. $v \neq 0$, then $\xi < R_{Th}$.

It is desirable for the threshold $R_{Th}$ to be a constant independent of the data and for the decision statistic $\xi$ to be insensitive to echo-path variations when $v=0$. Moreover, it is desirable that decisions are made without introducing any undue delay; since delayed decisions adversely affect the performance of an echo canceller (EC).

Figure 3:
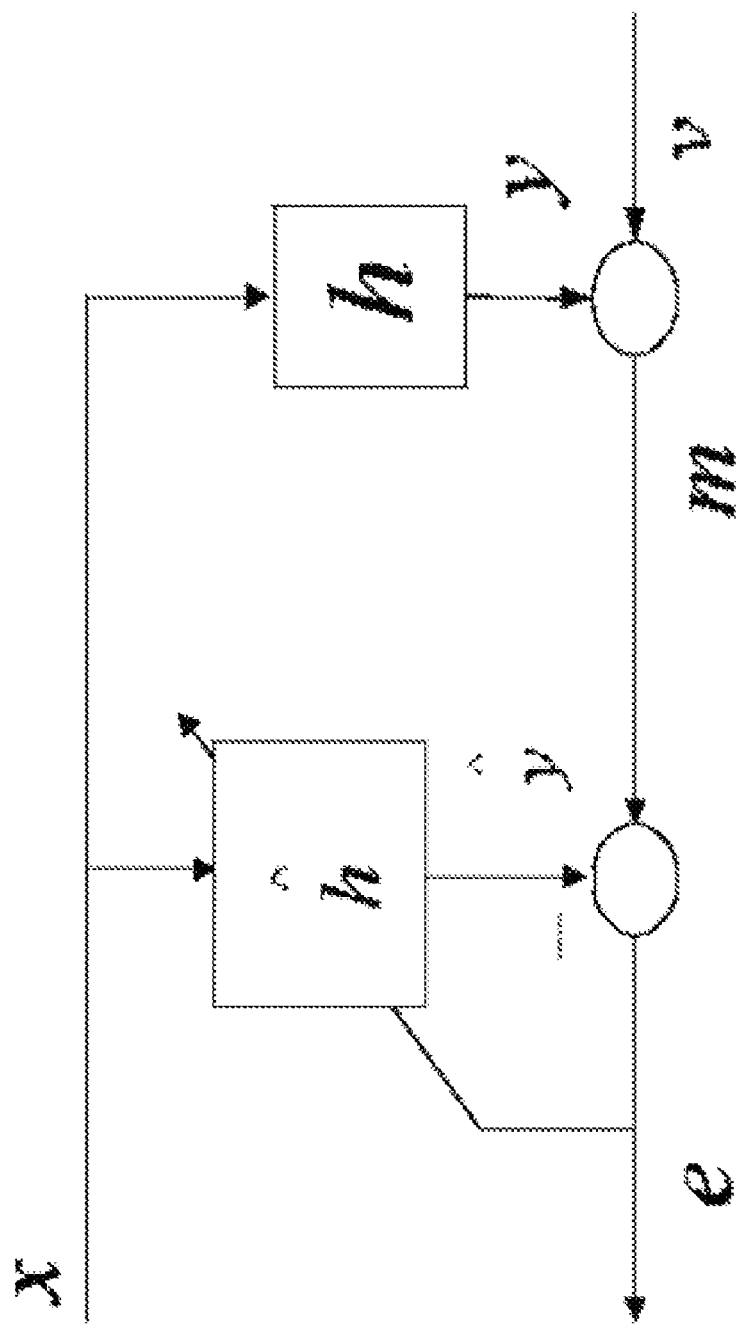
FIG. 3 schematically illustrates another example of an echo canceller (EC).

FIG. 3 shows the basic structure of an adaptive echo canceller (EC) in the time domain. The reference signal x is filtered through the room impulse response h to get the echo signal:

$$y(n)=h^T x$$

where $$h=[h_0 h_1 \ldots, h_{L-1}]^T,$$

$$x=[x(n)x(n-1) \ldots, x(n-L+1)]^T,$$

and L is the length of the echo-path. This echo signal is added to the near-end signal signal v to yield the corrupted signal:

$$m(n)=y(n)+v(n)$$

The error signal at time n is:

$$e(n)=m(n)-\hat{h}^T x$$

This error signal is used to adapt the L taps of the adaptive AEC filter $\hat{h}$.

Others have proposed using the cross-correlation vector between the reference signal vector x (which is played out of the speakers for AEC) and the AEC's cancellation error e, $r_{ex}=E[ex^T]$, as the basis for near-end signal detection (XECC algorithm). Simulation results indicate that this approach does not work well for detecting near-end signal, and a theoretical derivation provides further insight. Noting that the near-end signal v is independent of the reference signal x and assuming all of the signals are zero mean, the cross-correlation between the AEC's error signal and the reference signal is:

$$r_{ex} = E\left[\left(y + v - \hat{h}^T x\right) x^T\right]$$
$$= E\left[\left(h^T x - \hat{h}^T x\right) x^T\right]$$
$$= \left(h^T - \hat{h}^T\right) R_{xx}$$

where $E[\bullet]$ denotes the mathematical expectation and $R_{xx}=E[xx^T]$. From the above, it is apparent that $r_{ex}$ is high only when there is a change in the echo-path; hence the XECC is more suitable for tracking echo-path variations rather than detecting near-end signal. When the XECC is high, echo only (no near-end signal) with echo-path change is considered present in the corrupted signal. When the XECC is low, near-end signal, doubletalk, echo only with no echo-path change or noise only can be present in the corrupted signal. Thus, the XECC cannot distinguish between near-end signal and only noise in the corrupted signal, so it cannot detect near-end signal.

Others also have proposed an algorithm based on the cross-correlation between the reference signal vector x and the corrupted signal scalar m, $r_{xm}=E[xm]$ (XMCC algorithm). The XMCC decision statistic is given by $$\xi_{XMCC} = \sqrt{r_{xm}^T (\sigma_m^2 R_{xx})^{-1} r_{xm}}$$

where $R_{xx}$ is defined as above and the variance of the corrupted signal ($\sigma_m^2$) is $$\sigma_m^2 = E[mm^T]$$
$$= E[(y+v)(y+v)^T]$$
$$= E[yy^T] + E[vv^T]$$
$$= E[h^T x (h^T x)^T] + \sigma_v^2$$
$$= h^T R_{xx} h + \sigma_v^2.$$

When the XMCC is high, echo only with or without echo path change is considered present in the corrupted signal. When the XMCC is low, near-end signal, doubletalk or only noise are present in the corrupted signal. Thus, the XMCC cannot distinguish near-end signal from echo-path variation or only noise.

Instead of using $r_{ex}$ or $r_{xm}$ as discussed above, the cross-correlation between the corrupted signal m and the cancellation error e, $r_{em}=E[em]$, can be used as the basis for signal detection (MECC algorithm). By way of example, the decision statistic can be defined to be $$\xi_{MECC} = 1 - \frac{r_{em}}{\sigma_m^2}.$$

The cross-correlation between the corrupted signal and the cancellation error is $$r_{em} = E\left[\left(y + v - \hat{h}^T x\right)(y + v)^T\right]$$
$$= E\left[\left(h^T x - \hat{h}^T x + v\right)(h^T x + v^T)\right]$$
$$= E\left[\left(h^T x - \hat{h}^T x\right)x^T h + vv^T\right]$$
$$= \left(h^T - \hat{h}^T\right)R_{xx} h + \sigma_v^2$$

where $\sigma_v^2$ is the near-end signal power, and the reference signal vector x and the near-end signal v are independent and are assumed to be zero mean. Substituting equations yields:

$$\xi_{MECC} = 1 - \frac{\left(h^T - \hat{h}^T\right)R_{xx} h + \sigma_v^2}{h^T R_{xx} h + \sigma_v^2}$$
$$= \frac{\hat{h}^T R_{xx} h}{h^T R_{xx} h + \sigma_v^2}.$$

for v=0, $\xi_{MECC} \approx 1$ and for v≠0, $\xi_{MECC} < 1$.

The values for $r_{em}$ and $\sigma_m$ are not available in practice. As a result, a practical decision statistic is:

$$\xi_{MECC} = 1 - \frac{\hat{r}_{em}}{\hat{\sigma}_m^2},$$

which is based on either the sample estimates $\hat{r}_{em}(n)$ and $\hat{\sigma}_m^2(n)$ or the frame estimates $\hat{r}_{em}(t)$ and $\hat{\sigma}_m^2(t)$. The sample estimates for time sample n can be found, for instance, by using an exponential recursive weighting algorithm as:

$$\hat{r}_{em}(n) = \lambda \hat{r}_{em}(n-1) + (1-\lambda)e(n)m(n)$$

$$\hat{\sigma}_m^2(n) = \lambda \hat{\sigma}_m^2(n-1) + (1+\lambda)m^2(n)$$

where e(n) is the cancellation error at time sample n, m(n) is the captured corrupted signal sample at the time sample n, and $\lambda$ is an exponential weighting factor. In another example, the frame estimates for time frame t can also be found, for instance, by using an exponential recursive weighting algorithm, which is the maxima of the correlation in a frame as:

$$\hat{r}_{em}(t) = \lambda \hat{r}_{em}(t-1) + (1-\lambda)e(t)m^T(t)$$

$$\hat{\sigma}_m^2(t) = \lambda \hat{\sigma}_m^2(t-1) + (1-\lambda)m(t)m^T(t)$$

where e(t) is the cancellation error vector in the time frame t, m(t) is the captured corrupted signal vector at the time frame t, and $\lambda$ is an exponential weighting factor.

The previous estimates of the corrupted signal variance (e.g. $\hat{\sigma}_m^2(n), \hat{\sigma}_m^2(t)$) assume that the corrupted signal has zero mean. If the corrupted signal does not have zero mean, the mean can also be recursively estimated and incorporated in the corrupted signal variance estimate. In one example for the time domain, sample based decision statistic:

$$\hat{\mu}_m(n) = \lambda \hat{\mu}_m(n-1) + (1-\lambda)m(n)$$

$$\hat{\sigma}_m^2(n) = \lambda \hat{\sigma}_m^2(n-1) + (1-\lambda)(m(n) - \hat{\mu}_m(n))^2$$

where $\hat{\mu}_m(n)$ is the sample based estimate of the mean of the corrupted signal. In another example for the time domain, frame based decision statistic:

$$\hat{\mu}_m(t) = \lambda \hat{\mu}_m(t-1) + \frac{(1-\lambda)}{L}\sum_{l=0}^{L-1} m_l(t)$$

$$\hat{\sigma}_m^2(t) = \lambda \hat{\sigma}_m^2(t-1) + (1-\lambda)(m(t) - \hat{\mu}_m(t))(m(t) - \hat{\mu}_m(t))^T$$

where $\hat{\mu}_m(t)$ is the frame based estimate of the mean of the corrupted signal, and $m_l(t)$ is the lth element in the corrupted signal vector of length L. Since smaller values of $\lambda$ yield better time varying signal tracking capability at the expense of worse estimation accuracy, for slowly time varying signals, $0.9 \leq \lambda \leq 1$ can be chosen. When $\xi_{MECC} < R_{Th}$, the captured frame of the corrupted signal can be considered to have near-end signal present and adaptation of the EC's adaptive filter(s) is halted. Otherwise, adaptation is continued. Although an MECC algorithm can be employed in this manner, the MECC decision statistic will be low when near-end signal is absent and echo is present (echo only) if echo-path change also is present. The sample based and frame based decision statistics can further include a noise term that is an indication of the noise in the corrupted signal, for instance, an estimate of the power of the noise. In one example, the decision statistic including the noise term can be:

$$\xi_{MECC} = 1 - \frac{\hat{r}_{em} - \hat{\sigma}_z^2}{\hat{\sigma}_m^2}$$

where $\hat{\sigma}_z^2$ is the variance of the noise in the nth sample ($\hat{\sigma}_z^2(n)$) for the sample based decision statistic or is the variance of the noise in the tth frame ($\hat{\sigma}_z^2(t)$) for the frame based decisions statistic. In another example, the decision statistic including the noise term can be:

$$\xi_{MECC} = 1 - \frac{\hat{r}_{em} - \hat{\sigma}_z^2}{\hat{\sigma}_m^2 - \hat{\sigma}_z^2}$$

There are other methods of estimating the cross-correlation coefficient and the variance of the corrupted signal and any suitable method can be used.

In addition to its simplicity, another advantage of the MECC algorithm is that only the maximum cross-correlation needs to be computed instead of computing the entire cross-correlation vector as is required by the other algorithms. This results in significant computational savings compared to the other algorithms, requiring only 21 multiplications, 3 additions and a division to compute the decision statistic, where l=256 samples is the frame size for 16 kHz sample rate and 16 msec frames.

The MECC and the XMCC decision statistics are different in that the former is based on $r_{em}$ and the latter is based on $r_{xm}$. Substituting $r_{xm} = R_{xx}h$ and $\sigma_m^2 = h^T R_{xx} h + \sigma_v^2$ in the XMCC decision statistic equation above yields:

$$\xi_{XMCC}^2 = h^T R_{xx} (\sigma_m^2 R_{xx})^{-1} R_{xx} h$$
$$= \frac{h^T R_{xx} h}{h^T R_{xx} h + \sigma_v^2},$$

whereas the MECC decision statistic is given by:

$$\xi_{MECC} = \frac{\hat{h}^T R_{xx} h}{h^T R_{xx} h + \sigma_v^2}.$$

In addition to the square root, the other difference between the decision statistics is in the numerator – $\xi_{MECC}$ has the taps of the EC filter $\hat{h}^T$ in its numerator and $\xi_{XMCC}$ has the true echo-path impulse response $h^T$ in its numerator. However, for practical implementation and computational simplicity, $\hat{h}^T$ can be substituted for $h^T$ in $\xi_{XMCC}$. Hence, the MECC (based on cross-correlation of the corrupted signal and the error signal) has the same performance as the XMCC (based on cross-correlation of the reference signal and the corrupted signal) but with an order of magnitude decrease in computational complexity.

To determine the presence of near-end signal, the decision statistic can be compared to a threshold and near-end signal can be declared if the decision statistic is less than (or greater than depending on the decision statistic used) the threshold. The threshold can be found, for instance, by offline training in order to achieve some specified probability of miss ($P_m$) (the probability of not detecting (miss) near-end signal when it is present).

Simulations were performed to assess the MECC. The performance was characterized in terms of the probability of miss ($P_m$) as a function of near-end to far-end ratio (NFR) under a probability of false alarm ($P_f$) constraint. Since the probability of miss ($P_m$) is the probability of not detecting (miss) near-end signal when it is present, a smaller value of $P_m$ indicates better performance. To evaluate the MECC algorithm, the following steps were performed according to a protocol described in Benesty, et al., "A New Class of Doubletalk Detectors Based on Cross-Correlation," *IEEE Transactions on Speech and Audio Processing*, vol. 8, pp. 168-172, March 2000:

1. Set v=0 (No near-end speech).
   (a) Select the threshold $R_{Th}$ for the decision statistic;
   (b) Compute $P_f$;
   (c) Repeat steps a, b over a range of threshold values; and
   (d) Select the threshold that corresponds to $P_f$=0.1.
2. Select NFR value
   (a) Select one of the four 2 second near-end speech samples;
   (b) Select one of four positions within 5 second far-end speech;
   (c) Compute $P_m$;
   (d) Repeat steps a, b, c over all sixteen conditions;
   (e) Average $P_m$ over all sixteen conditions.
3. Repeat step 2 over a range of NFR values; and
4. Plot average $P_m$ as a function of NFR.

Figure 4:
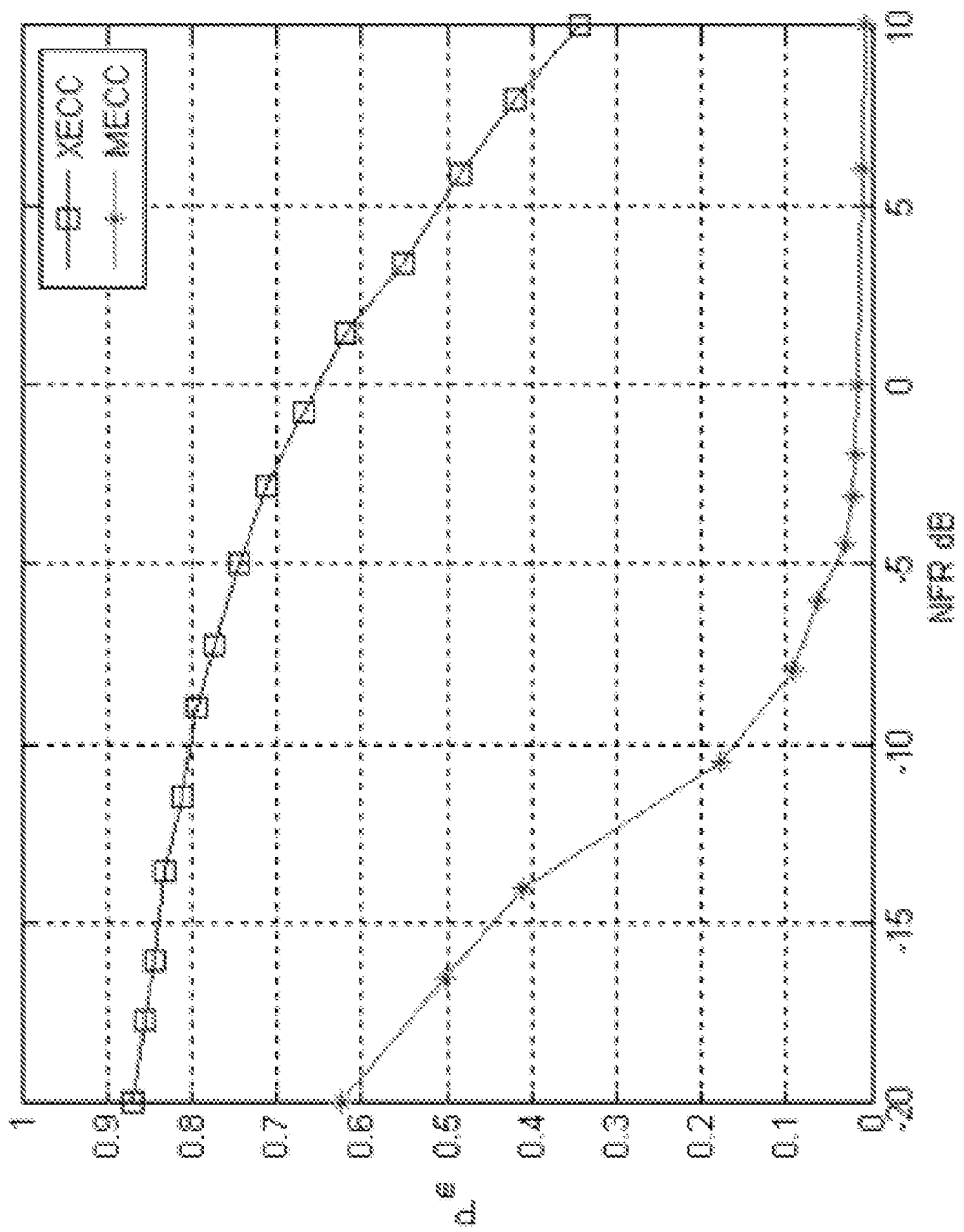
FIG. 4 is a graph showing the performance of the XECC and MECC detectors (acronyms explained below).

Recorded digital speech sampled at 16 KHz was used as far-end signal x and near-end signal v and a measured L=8000 sample (500 ms) room impulse response of a 10'×10'×8' room was used as the loudspeaker-microphone environment h. The $P_m$ characteristics of the MECC under the constraint of $P_f$=0.1 were compared to those of the XECC as shown in FIG. 4. As shown, the MECC significantly outperformed the XECC over a full-range of NFR values.

Figure 5:
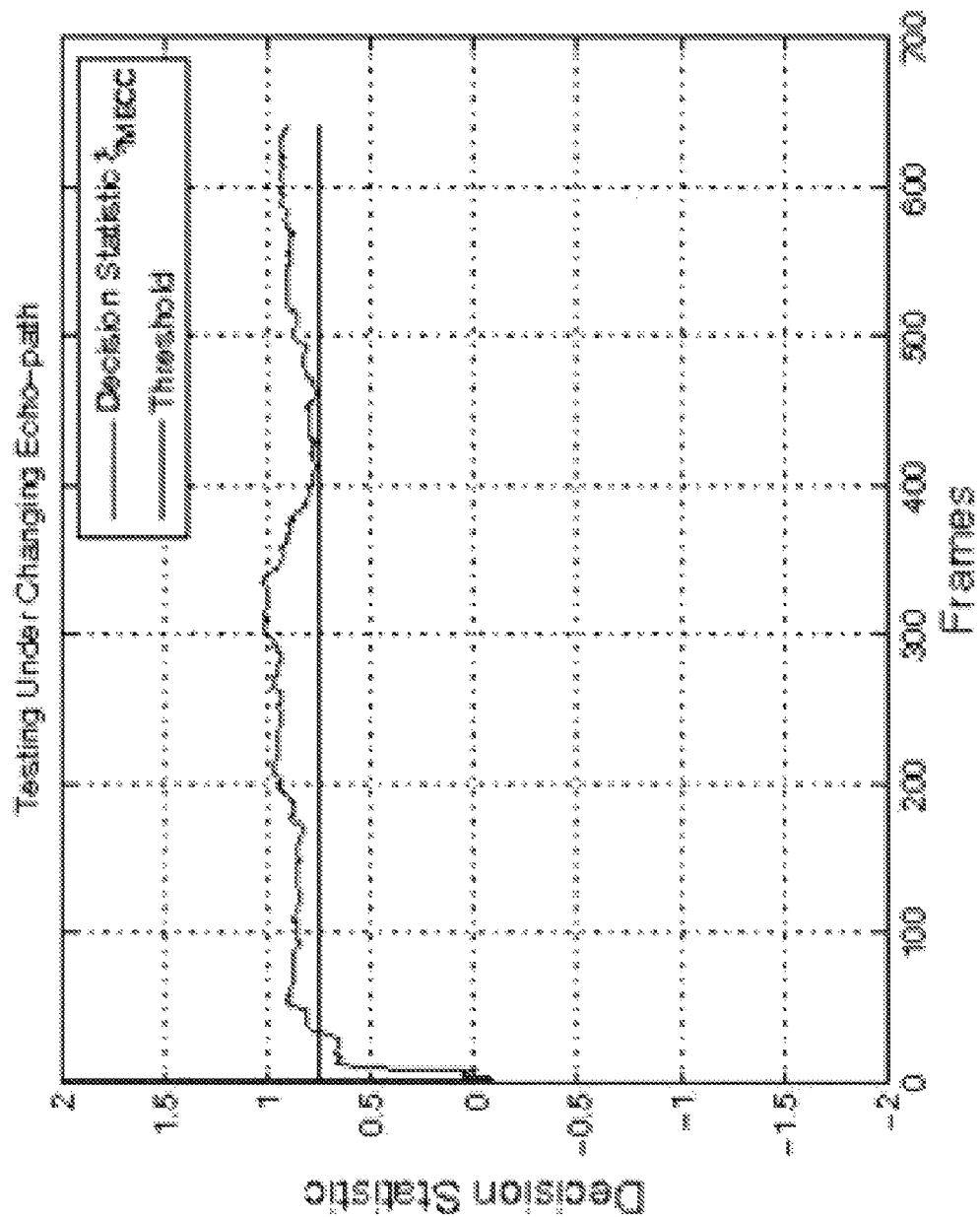
FIG. 5 is a graph showing the performance of the MECC decision statistic (acronyms explained below).
Figure 6:
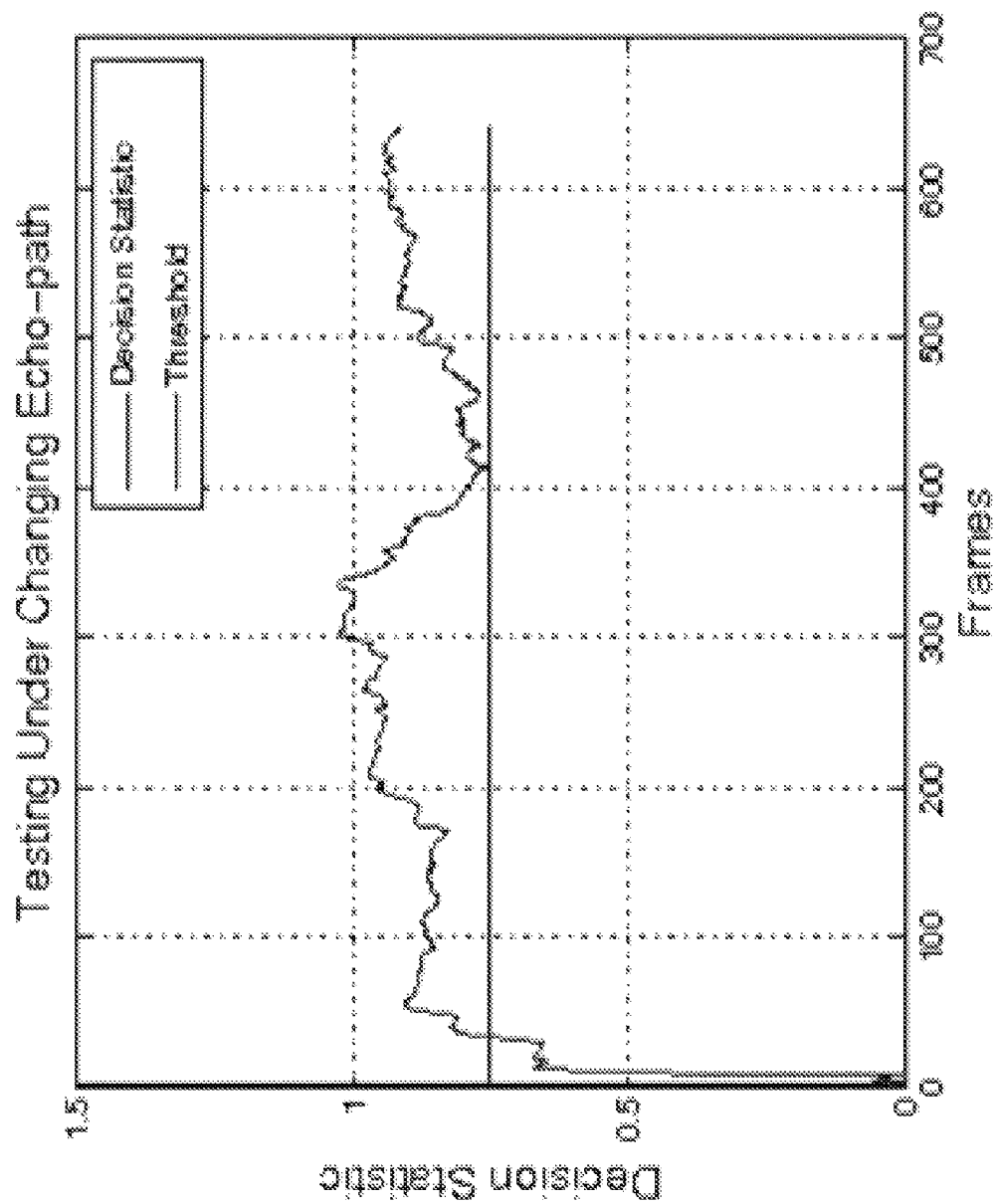
FIG. 6 is a graph showing the performance of the MECC decision statistic (acronyms explained below).

To study the effects of echo-path variations, the decision statistic $\xi_{MECC}$ was plotted as a function of time (frames) in the absence of near-end speech as shown in FIGS. 5-6. The decision statistic was greater than threshold ($\xi_{MECC} > R_{Th}$) even after (300 frames) echo-path variations. This was observed for a variety of echo-path variations. However, if the echo-path change is large, the MECC can lead to false alarms by classifying echo in the presence of echo path change as near-end signal. As will be explained in greater detail below, one or more components that provide additional information can be added to the MECC to reduce the false alarm rate.

The MECC algorithm also can be implemented in the frequency domain by using a frequency domain based decision statistic for each subband, for instance:

$$\xi_{MECC}(k, t) = 1 - \frac{\hat{r}_{em}(k, t)}{\hat{\sigma}_m^2(k, t)}$$

where $\hat{r}_{em}(k,t)$ is an estimate of the cross-correlation coefficient between the corrupted signal and the error signal for the kth frequency subband and tth frame and $\hat{\sigma}_m^2(k,t)$ is the estimate of the variance of the corrupted signal for the kth frequency subband and tth frame. In one example, the cross-correlation coefficient between the corrupted signal and the error signal and the variance of the corrupted signal can be updated as:

$$\hat{r}_{em}(k,t) = \lambda \hat{r}_{em}(k,t-1) + (1-\lambda)|E(k,t)M^*(k,t)|$$

$$\hat{\sigma}_m^2(k,t) = \lambda \hat{\sigma}_m^2(k,t-1) + (1-\lambda)M(k,t)M^*(k,t)$$

where $E(k,t)$ is the kth subband of the frequency domain transform of the tth frame of the echo cancellation error, $M(k,t)$ is the kth subband of the frequency domain transform of the tth frame of the corrupted signal vector, and $M^*(k,t)$ is the conjugate of $M(k,t)$. Any standard frequency domain transform can be used such as the Fast Fourier Transform (FFT) or the Modulated Complex Lapped Transform (MCLT). The estimate of the corrupted signal variance (e.g., $\hat{\sigma}_m^2(k,t)$) assumes that the corrupted signal has zero mean. If the corrupted signal does not have zero mean, the mean can also be recursively estimated and incorporated in the corrupted signal variance estimate. In another example for the frequency domain, frame based decision statistic:

$$\hat{\mu}_m(k,t) = \lambda \hat{\mu}_m(k,t-1) + M(k,t)$$

$$\hat{\sigma}_m^2(k,t) = \lambda \hat{\sigma}_m^2(k,t-1) + (1-\lambda)(M(k,t) - \hat{\mu}_m(k,t))(M(k,t) - \hat{\mu}_m(k,t))^*$$

Where $\hat{\mu}_m(k,t)$ is the frame based estimate of the mean of the corrupted signal and * designates the conjugate. The decision statistic can further include a noise term that is an indication of the noise in the kth frequency subband of the corrupted signal, for instance, an estimate of the power of the noise. In one example, the subband decision statistic including the noise term can be:

$$\xi_{MECC}(k, t) = 1 - \frac{\hat{r}_{em}(k, t) - \hat{\sigma}_z^2(k, t)}{\hat{\sigma}_m^2(k, t)}$$

where $\hat{\sigma}_z^2(k,t)$ is the variance of the noise in the kth subband and the tth frame. In another example, the subband decision statistic including the noise term can be:

$$\xi_{MECC}(k, t) = 1 - \frac{\hat{r}_{em}(k, t) - \hat{\sigma}_z^2(k, t)}{\hat{\sigma}_m^2(k, t) - \hat{\sigma}_z^2(k, t)}$$

There are other methods of estimating the cross-correlation coefficient and the variance of the corrupted signal and any suitable method can be used.

Figure 7:
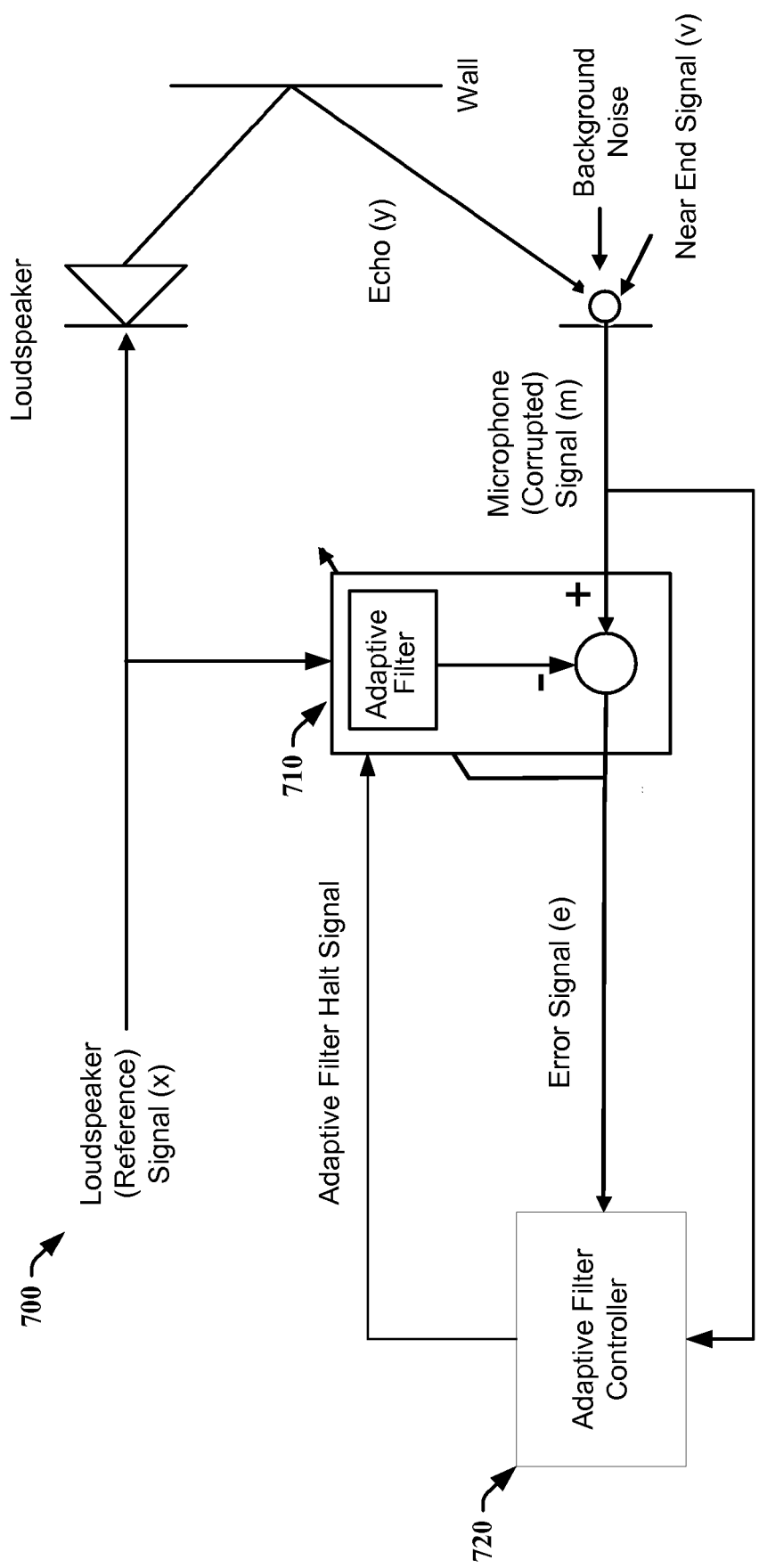
FIG. 7 is a block diagram of one example of a system for controlling an EC.

FIG. 7 schematically illustrates one example of a system 700 for controlling an echo canceller (EC) having at least one adaptive filter 710. The system 700 can include at least one adaptive filter controller 720 corresponding to the adaptive filter 710 and configured to halt adaptation of the adaptive filter 710 according to the cross-correlation of the corrupted signal m and the error signal of the EC e, such as by employing a decision statistic. As explained above, for AEC (shown in FIG. 7) the microphone signal is the corrupted signal and for LEC (not shown in FIG. 7) on a telecommunications device the signal input to the telephone speaker is the corrupted signal. Any suitable decision statistic that is based on the cross-correlation of the corrupted signal m and the error of the EC e can be used such as those described above and below. The decision statistic can be implemented in the time domain $$\left(\text{e.g.}, 1 - \frac{\hat{r}_{em}(n)}{\hat{\sigma}_m^2(n)}, 1 - \frac{\hat{r}_{em}(t)}{\hat{\sigma}_m^2(t)}\right)$$

and can include a noise term $$\left(\text{e.g.}, 1 - \frac{\hat{r}_{em}(n) - \hat{\sigma}_z^2(n)}{\hat{\sigma}_m^2(n)}, 1 - \frac{\hat{r}_{em}(n) - \hat{\sigma}_z^2(n)}{\hat{\sigma}_m^2(n) - \hat{\sigma}_z^2(n)}, \right.$$
$$\left. 1 - \frac{\hat{r}_{em}(t) - \hat{\sigma}_z^2(t)}{\hat{\sigma}_m^2(t)}, 1 - \frac{\hat{r}_{em}(t) - \hat{\sigma}_z^2(t)}{\hat{\sigma}_m^2(t) - \hat{\sigma}_z^2(t)}\right).$$

The decision statistic can be used by the system 700 to halt the adaptation of the adaptive filter 710 in any suitable manner, for instance when the decision statistic is less than a prescribed threshold.

Figure 8:
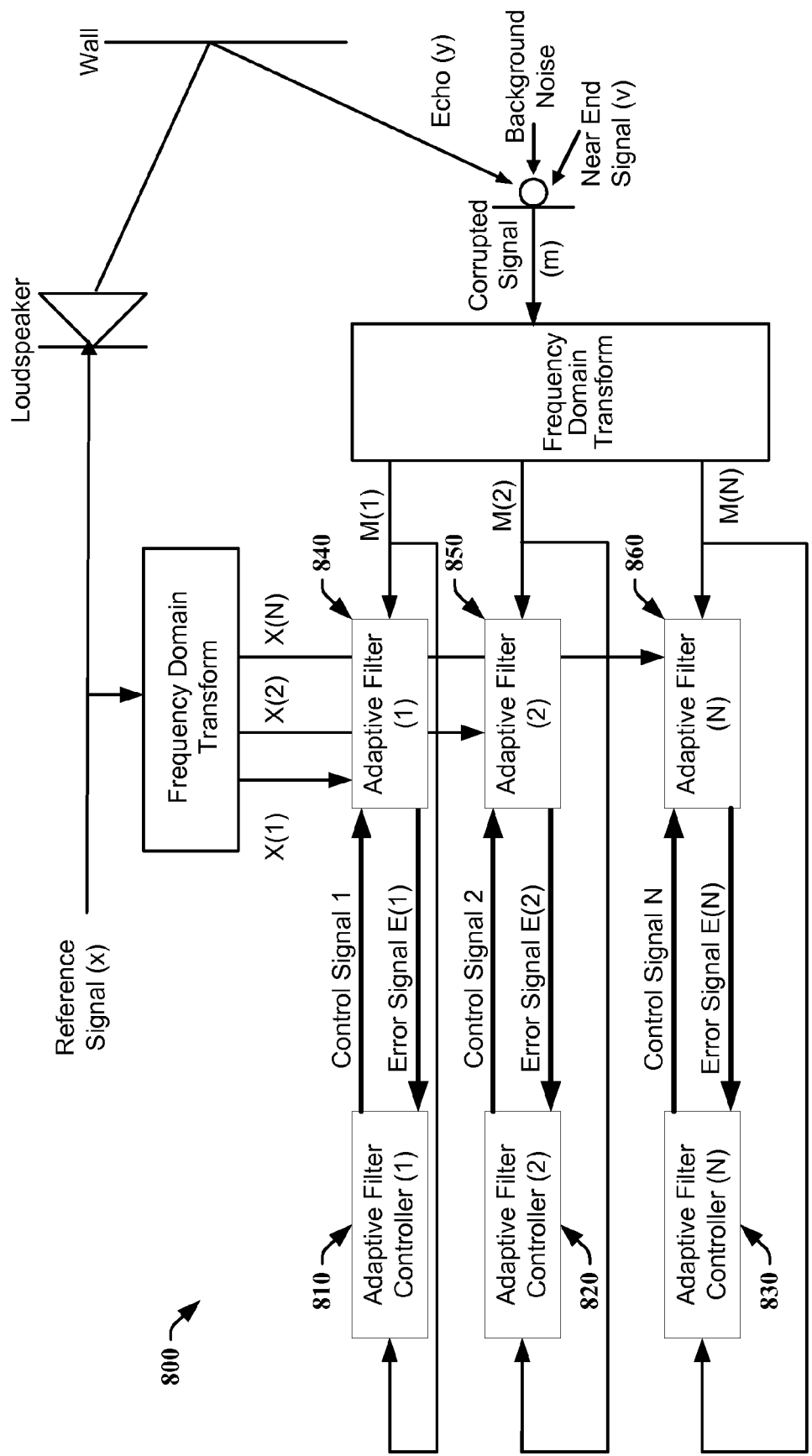
FIG. 8 is a block diagram of another example of a system for controlling an EC.

FIG. 8 schematically illustrates another example of a system 800 for controlling an acoustic echo canceller. The system 800 can have multiple adaptive filter controllers 810-830 and each adaptive filter controller 810-830 can, for instance, correspond to a frequency subband. Each of the adaptive filter controllers 810-830 can be configured to halt its corresponding adaptive filter 840-860 according to the cross-correlation of its corresponding corrupted signal and its corresponding error signal of its corresponding adaptive filter, for instance, by employing a decision statistic. One example of a frequency decision statistic that can be used is $$1 - \frac{\hat{r}_{em}(k, t)}{\hat{\sigma}_m^2(k, t)}$$

where $\hat{r}_{em}(k,t)$ is an estimate of the cross-correlation coefficient between the corrupted signal and the error signal for the kth frequency subband and $\hat{\sigma}_m^2(k,t)$ is the estimate of the variance of the corrupted signal for the kth frequency subband and the tth frame. The decision statistic can further include a noise term that is an indication of the noise in the kth frequency subband, for instance, an estimate of the power of the noise $$\left(\text{e.g.}, 1 - \frac{\hat{r}_{em}(k, t) - \hat{\sigma}_z^2(k, t)}{\hat{\sigma}_m^2(k, t)}, 1 - \frac{\hat{r}_{em}(k, t) - \hat{\sigma}_z^2(k, t)}{\hat{\sigma}_m^2(k, t) - \hat{\sigma}_z^2(k, t)}\right).$$

The adaptive filter controllers 810-830 can be configured to halt their corresponding adaptive filters 840-860 according to the decision statistic, such as by halting the adaptive filters 840-860 when their individual decision statistics are less than a threshold. By way of another example, the decision statistic can be an overall decision statistic for controlling all subbands in the frame. The overall decision statistic can be based on more than one of the individual decision statistics (e.g., a few, some, most or all) corresponding to the frequency subbands. For example, the overall decision statistic can be based on the total number of individual decision statistics for each frequency subband that meet some criteria in reference to a threshold (e.g., are greater than, greater than or equal to, less than or less than or equal to a threshold). The total number can be, for instance, some, a few, about half, exactly half, most, or all. The adaptive filter controllers 810-830 described above can be implemented by software or combinations of software and hardware and can be the same process executing on a single or a plurality of microprocessors or multiple processes executing on a single or a plurality of microprocessors.

Figure 9:
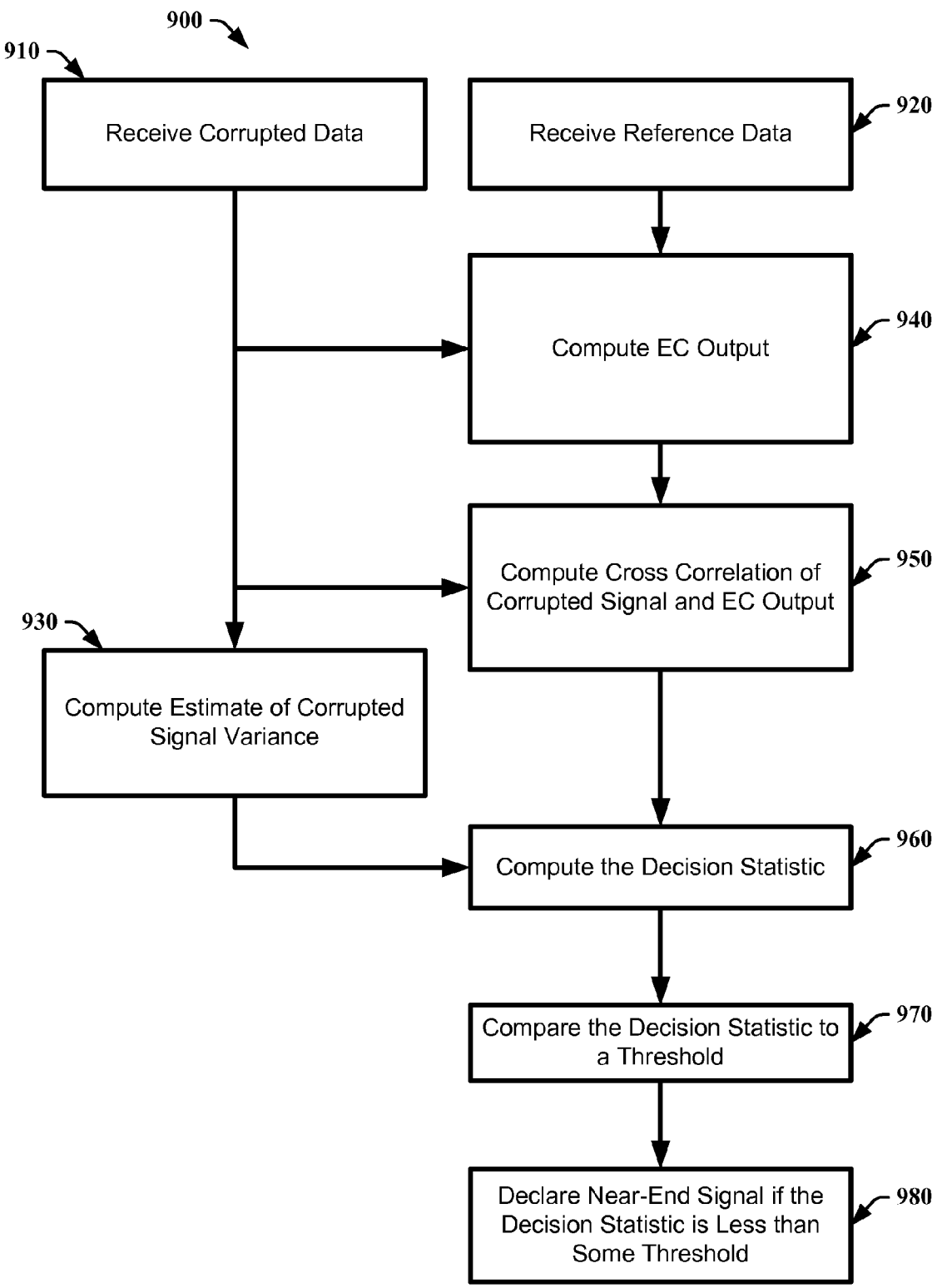
FIG. 9 is a flow diagram of one example of a method for declaring a near-end signal.

FIG. 9 a flow diagram of one example of a method 900 of declaring that a near-end signal (e.g., speech) is present. At steps 910 and 920 corrupted data and reference data are received. At step 930, the corrupted data variance is estimated. At step 940, the EC output, or error signal, is computed and at step 950 the corrupted signal and the EC output, or error signal, are cross-correlated. By way of example, in the frequency domain, these steps can be performed at the subband level. A decision statistic is computed at step 960. Any suitable decision statistic (e.g., time domain based, frequency domain based) can be used such as those described above and below. By way of example, in the frequency domain, a decision statistic can be computed for each frequency subband. At steps 960 and 970, the decision statistic is compared to a threshold value and if it is less than the threshold, near-end signal is declared in the capture data at 980. Any suitable threshold can be used. For example, the thresholds can be found by offline training in order to achieve some specified probability of miss ($P_m$). Although the steps 910-920 and 930-950 of the method 900 are illustrated in FIG. 9 as occurring in parallel, the steps can be performed in any suitable order, including sequentially.

Figure 10:
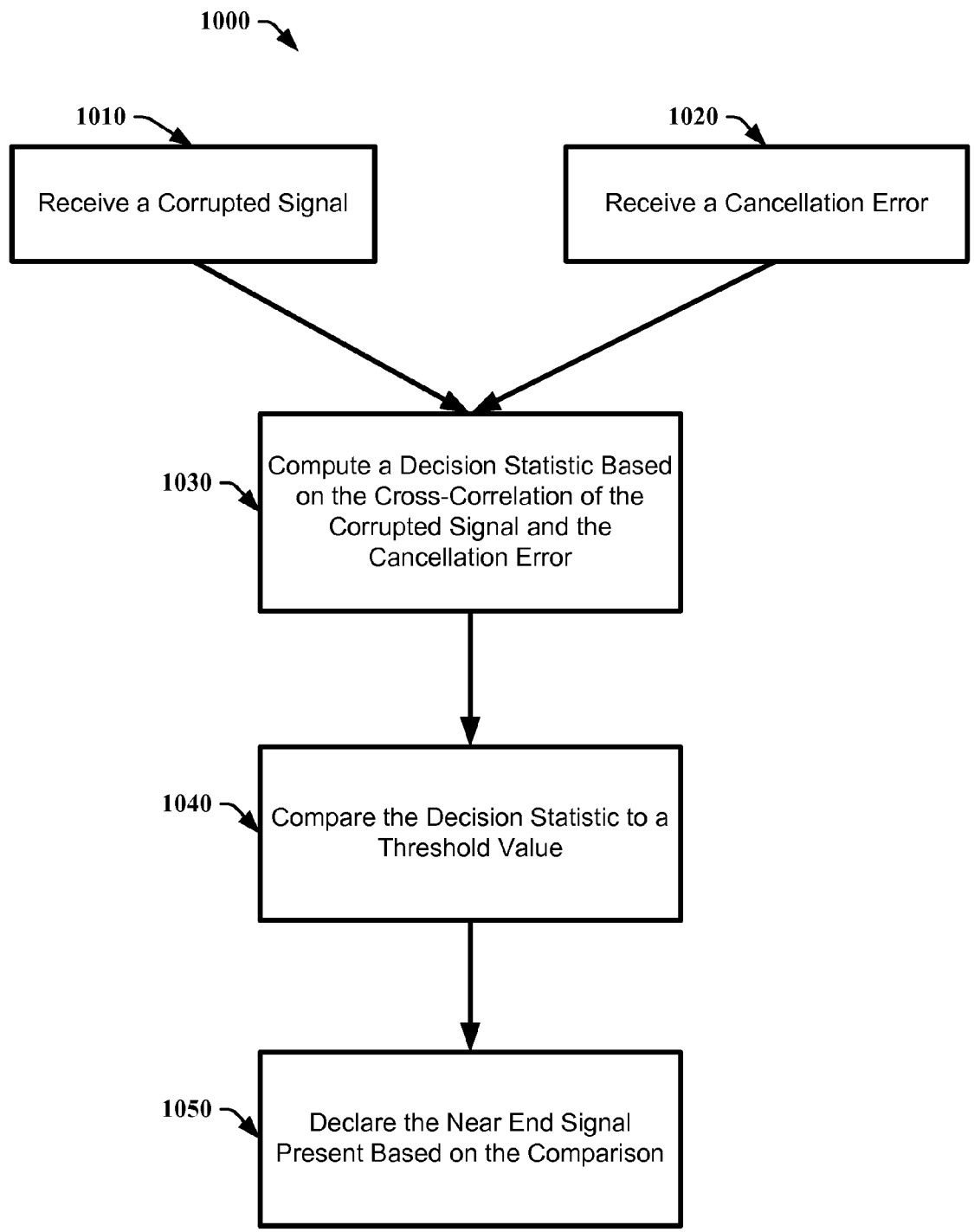
FIG. 10 is a flow diagram of one example of a method for controlling an EC.
Figure 11:
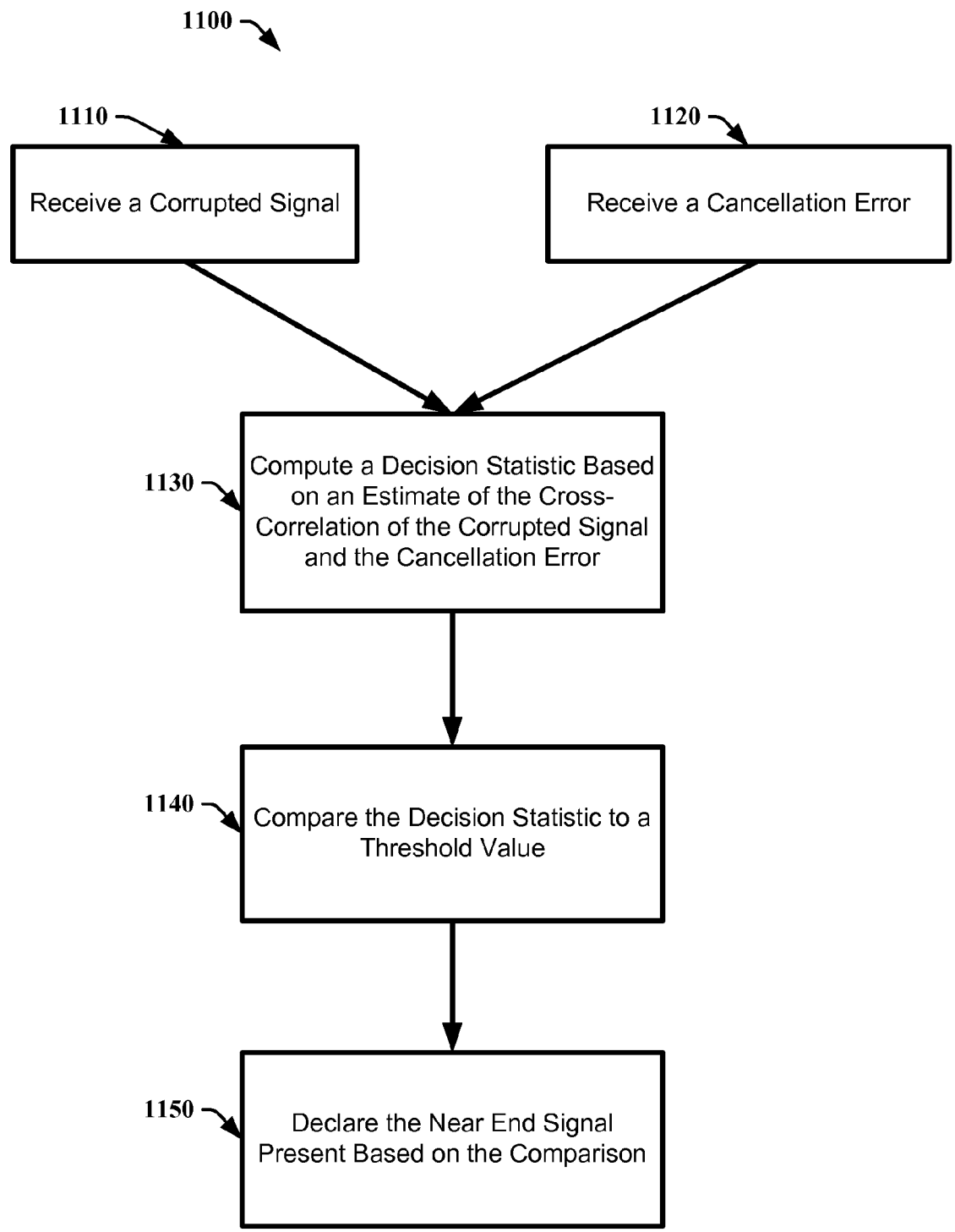
FIG. 11 is a flow diagram of another example of a method for controlling an EC.
Figure 12:
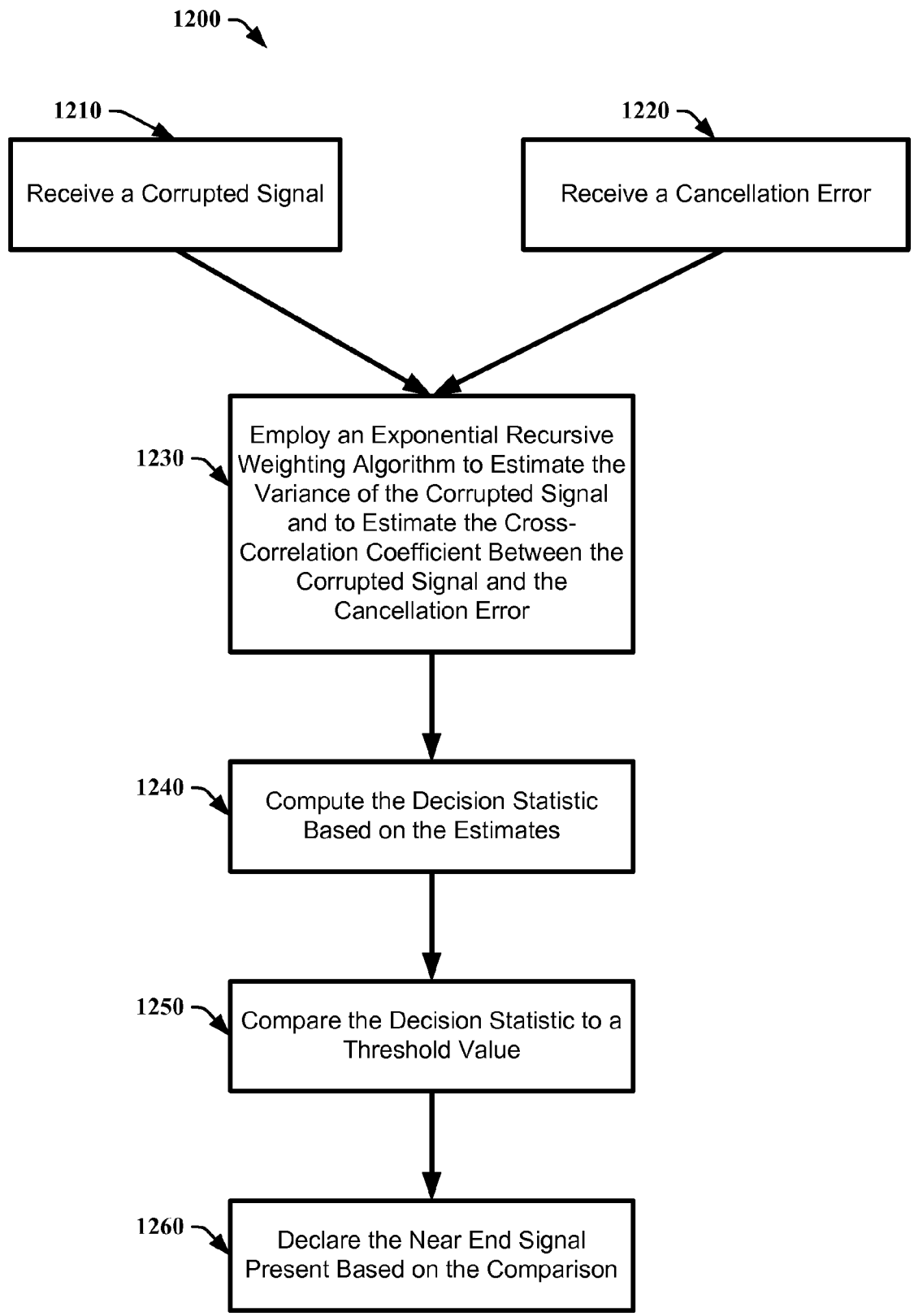
FIG. 12 is a flow diagram of yet another example of a method for controlling an EC.

FIGS. 10-12 are flow diagrams of three examples of methods 1000, 1100, 1200 of controlling an echo controller (e.g., AEC or LEC). At steps 1010, 1110, 1210 and 1020, 1120, 1220 a corrupted signal and a cancellation error from an adaptive filter of the echo canceller are received. Steps 1010, 1110, 1210 and 1020, 1120, 1220 can be performed in parallel or in any sequence. A decision statistic based on the cross-correlation of the corrupted signal and the cancellation error is computed as shown in FIG. 10 at step 1030. Any suitable decision statistic (e.g., time domain based, frequency domain based) can be employed such as those described above and below. The decision statistic can be based on an estimate of the cross-correlation of the corrupted signal and the cancellation error (e.g., by obtaining an estimate using an exponential recursive weighting algorithm) as shown in FIGS. 11 and 12 at steps 1130 and 1230-1240. The decision statistic is compared to a threshold value at steps 1040, 1140, 1250 and a near-end signal (e.g., speech) is declared present based on the comparison of the decision statistic to the threshold value at steps 1050, 1150, 1260. The near-end signal can be declared present if, for instance, the decision statistic is less than to the threshold value. If using the estimated cross-correlation decision statistic described below, the near-end signal can be declared present if the decision statistic is greater than the threshold value.

The methods 1000, 1100, 1200 can be implemented in the frequency domain, for instance, by computing a plurality of decision statistics each corresponding to one of a plurality of frequency subbands at steps 1030, 1130, 1240. Each of the plurality of decision statistics can be compared to its threshold value at steps 1040, 1140, 1250 and the near-end signal can be declared present based on the comparison at steps 1050, 1150, 1260. The near-end signal can be declared present if, for instance, at least some number (e.g., a few, some, most, about half, half or more, etc.) of the plurality of decision statistics are less than or less than or equal to their threshold values. Any suitable thresholds can be used, such as those determined based on a probability of miss. As described in more detail above, the decision statistic can be calculated at least in part by employing an exponential recursive weighting algorithm.

Figure 13:
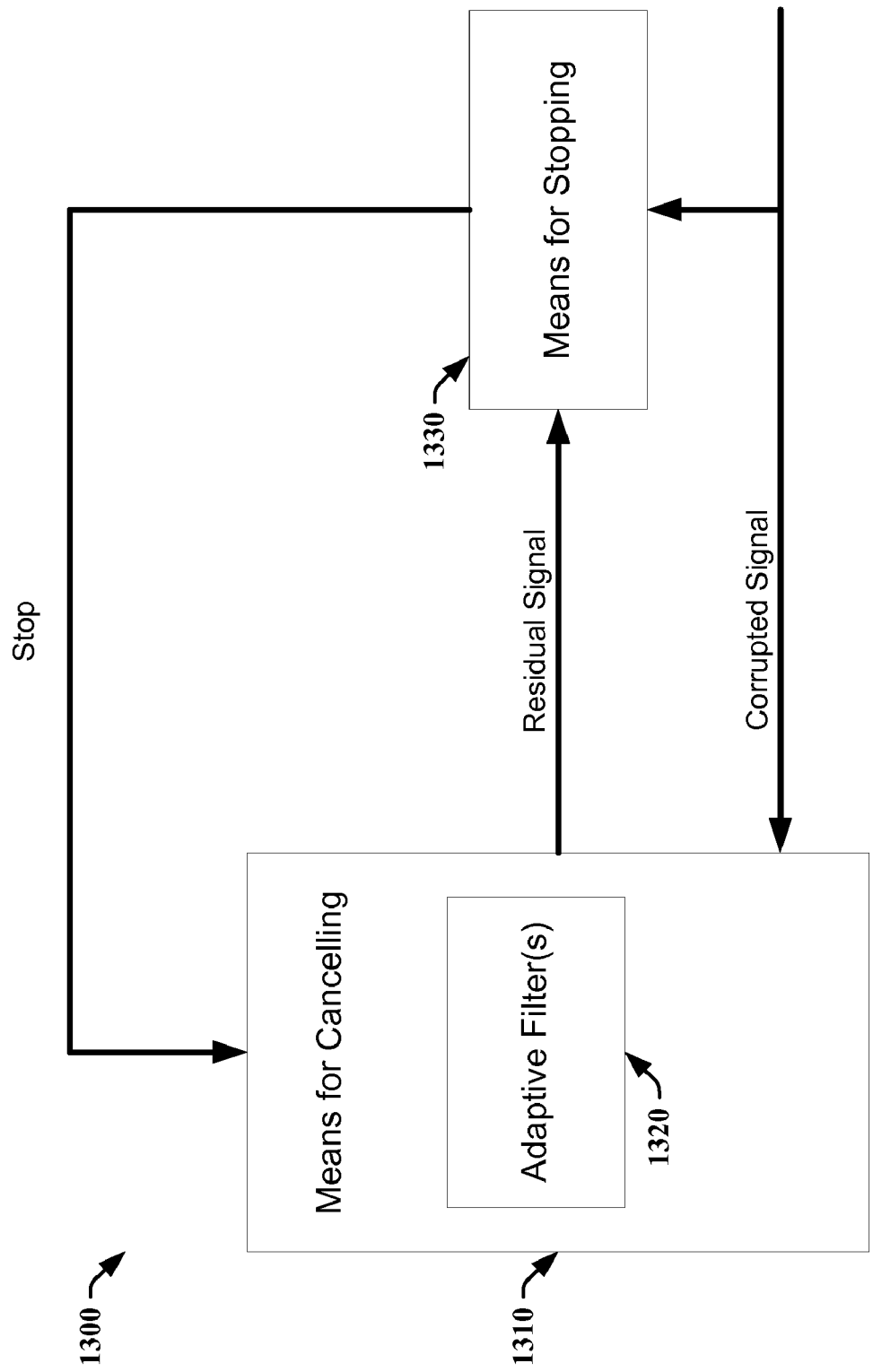
FIG. 13 is a block diagram of another example of a system for controlling an EC.

FIG. 13 is a block diagram of one example of a system 1300 for facilitating communication. The system includes means for cancelling an echo in a corrupted signal 1310. The means for cancelling the echo 1310 (e.g., an acoustic echo canceller or a line echo canceller) includes one or more adaptive filters 1320. The system 1300 also includes means for stopping 1330 the one or more adaptive filters from adapting based on the cross-correlation of the corrupted signal with a residual signal produced by the means for cancelling the echo 1310. The means for stopping 1330 can be implemented in any suitable manner, such as those described above (e.g., time domain based decision statistic, frequency domain based decision statistic, overall decision statistic). The means described above can be implemented by software or combinations of software and hardware and can be the same process executing on a single or a plurality of microprocessors or multiple processes executing on a single or a plurality of microprocessors.

Figure 14:
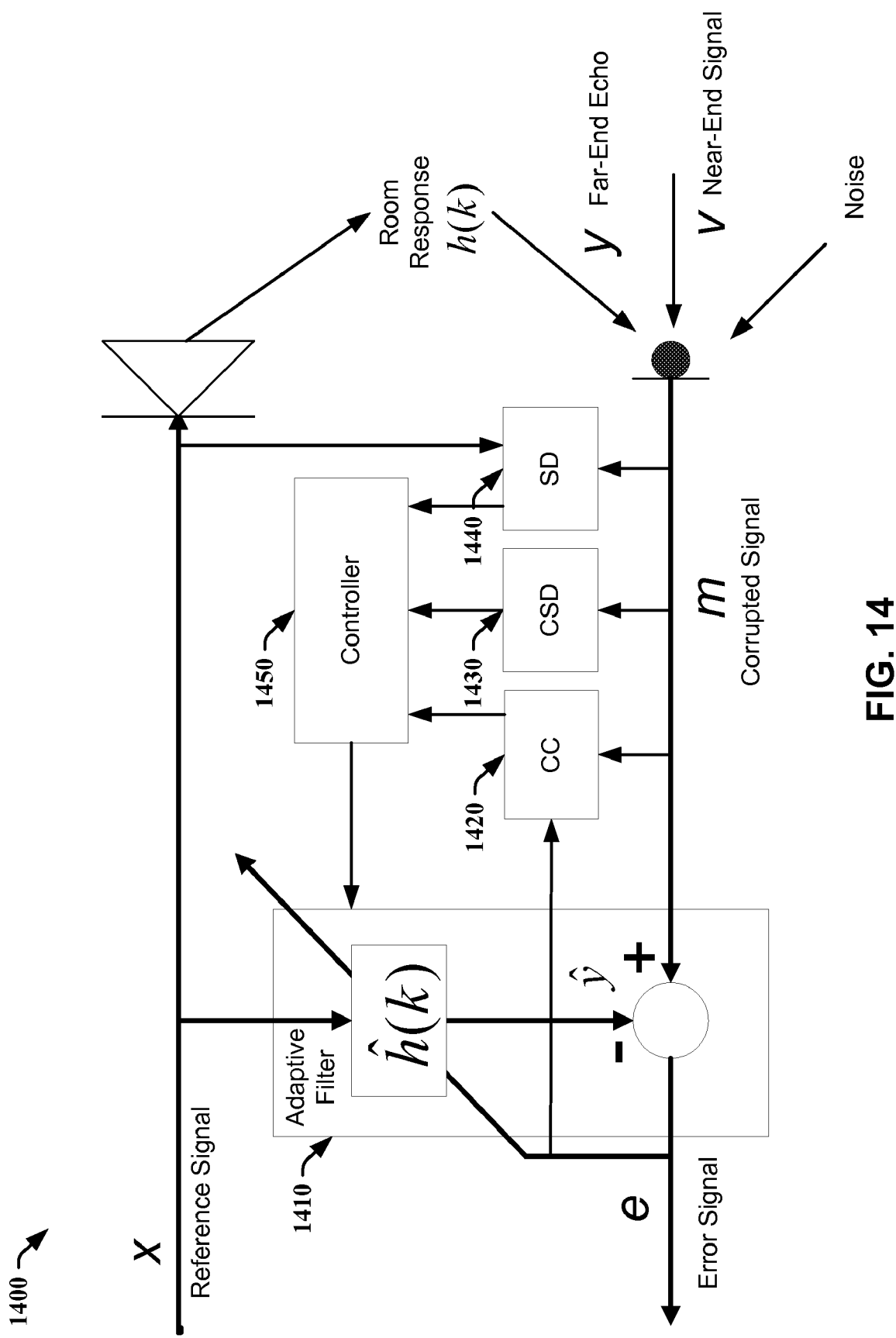
FIG. 14 is a block diagram of another example of a system for controlling an EC.
Figure 15A:
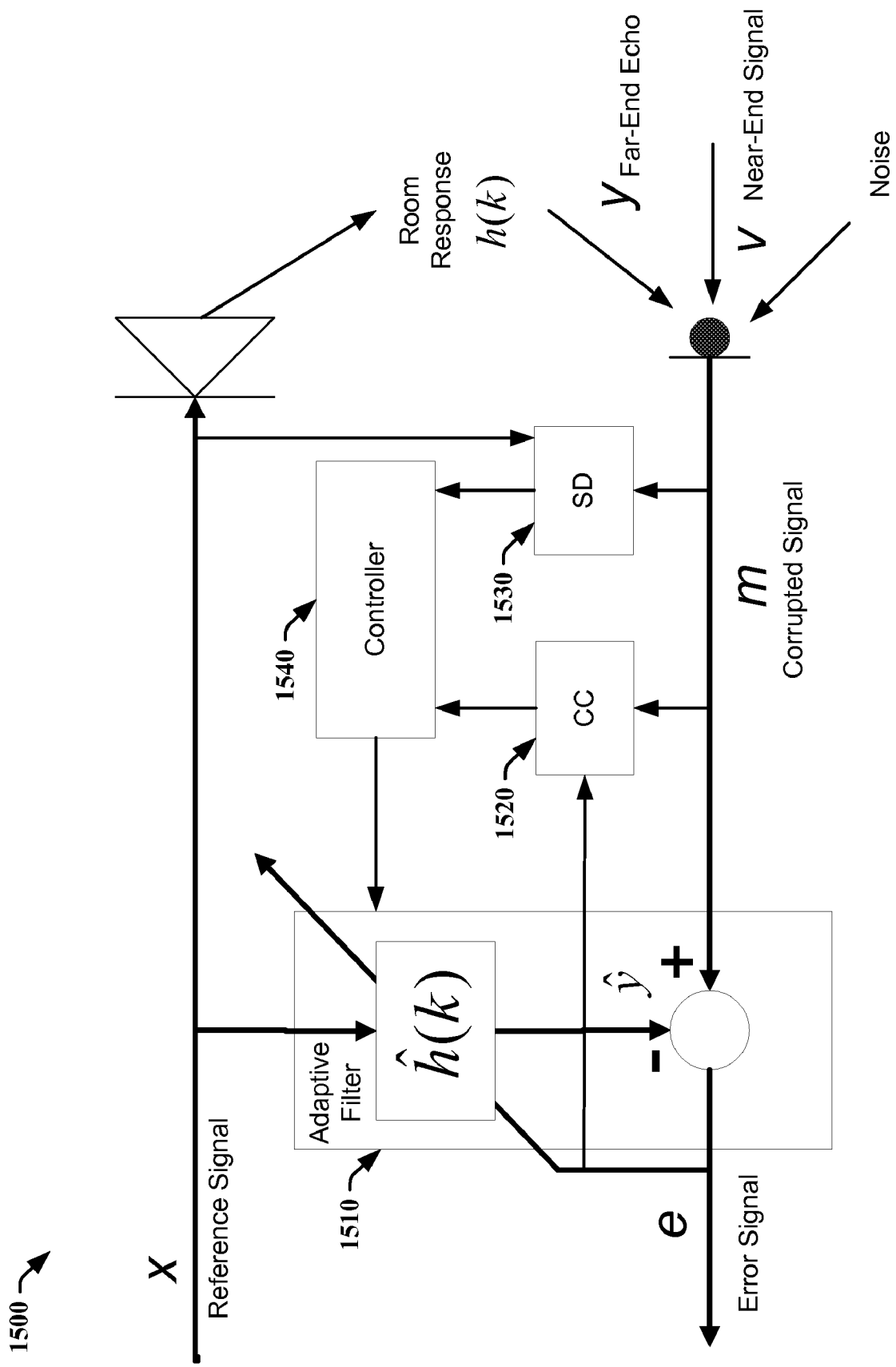
FIGS. 15A-C are block diagrams of other examples of a system for controlling an EC.

By way of another example, a hybrid system can be configured by, for instance, combining a cross-correlator (CC), a signal discriminator (SD) and optionally one or more detectors (e.g., corrupted signal detector (CSD) or a reference signal detector (RSD)) as shown in FIGS. 14-15 when the EC is an AEC. In the case of AEC, the corrupted signal is the microphone signal and the reference signal is the speaker signal. In the case of LEC (not shown) performed by a telecommunications device, the reference signal is the microphone signal and the corrupted signal is the speaker signal. Such a hybrid system can be configured to not only detect near-end signal, but also to track echo path variations efficiently as will be explained in more detail below. Any suitable cross-correlation measure can be utilized by the near-end speech detector, such as one between the microphone (corrupted signal) and the AEC cancellation error or one between the communications device speaker (corrupted signal) and the LEC cancellation error.

The cross-correlation measure can either be computed in the time domain or the frequency domain. One example of a time domain, cross-correlation based decision statistic that can be employed is:

$$\xi_{MECC} = 1 - \frac{\hat{r}_{em}}{\hat{\sigma}_m^2},$$

which is based on either the sample estimates $\hat{r}_{em}(n)$ and $\hat{\sigma}_m^2(n)$ or the frame estimates $\hat{r}_{em}(t)$ and $\hat{\sigma}_m^2(t)$. The sample estimates for time sample n can be found, for instance, by using an exponential recursive weighting algorithm as:

$$\hat{r}_{em}(n) = \lambda \hat{r}_{em}(n-1) + (1-\lambda)e(n)m(n)$$

$$\hat{\sigma}_m^2(n) = \lambda \hat{\sigma}_m^2(n-1) + (1-\lambda)m^2(n)$$

where e(n) is the echo cancellation error at time sample n, m(n) is the captured corrupted signal sample at the time sample n, and λ is an exponential weighting factor. In another example, the frame estimates for time frame t can also be found, for instance, by using an exponential recursive weighting algorithm, which is the maxima of the correlation in a frame:

$$\hat{r}_{em}(t) = \lambda \hat{r}_{em}(t-1) + (1-\lambda)e(t)m^T(t)$$

$$\hat{\sigma}_m^2(t) = \lambda \hat{\sigma}_m^2(t-1) + (1-\lambda)m(t)m^T(t)$$

where e(t) is the echo cancellation error vector in the time frame t, m(t) is the captured corrupted signal vector at the time frame t, and λ is an exponential weighting factor. As described previously, the mean can be recursively estimated and incorporated into both the sample-based and frame-based corrupted signal variance estimates for corrupted signals which do not have zero mean.

Figure 16:
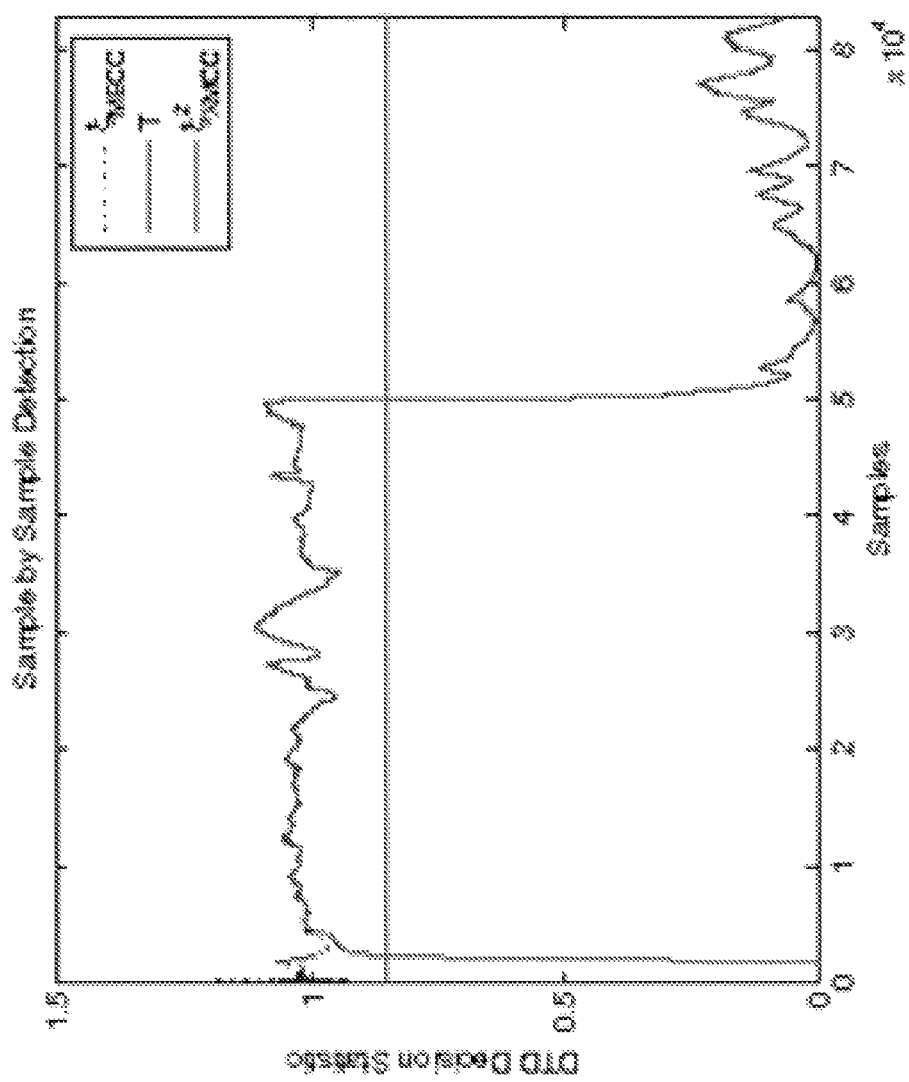
FIG. 16 is a graph showing the convergence of the MECC and XMCC detectors (acronyms explained below).

In addition to its simplicity, another advantage of the MECC decision statistic is that the maximum cross-correlation is computed instead of computing the entire cross-correlation vector as is required by other algorithms (XMCC, XECC). This results in significant computational savings as compared to the other algorithms, requiring only 2 multiplications, 2 additions, 1 subtraction and a division to compute the decision statistic at each sample (6 operations per sample), whereas for the XMCC statistic 3L+3 operations are required to compute the detection statistic at each sample where L is the frame size (typically L≧512). The performance of the MECC in comparison to the XMCC is shown in FIG. 16.

An example of a frequency domain, cross-correlation based decision statistic that can be employed is:

$$\xi_{MECC}(k, t) = 1 - \frac{\hat{r}_{em}(k, t)}{\hat{\sigma}_m^2(k, t)}$$

where $\hat{r}_{em}(k,t)$ is an estimate of the cross-correlation coefficient between the corrupted signal and the error signal for the kth frequency subband and tth frame and $\hat{\sigma}_m^2(k,t)$ is the estimate of the variance of the corrupted signal for the kth frequency subband and the tth frame. In one example, the cross-correlation coefficient between the corrupted signal and the error signal and the variance of the corrupted signal can be updated as:

$$\hat{r}_{em}(k,t) = \lambda \hat{r}_{em}(k,t-1) + (1-\lambda)|E(k,t)M^*(k,t)|$$

$$\hat{\sigma}_m^2(k,t) = \lambda \hat{\sigma}_m^2(k,t-1) + (1-\lambda)M(k,t)M^*(k,t)$$

where $E(k,t)$ is the kth subband of the frequency domain transform of the tth frame of the echo cancellation error, $M(k,t)$ is the kth subband of the frequency domain transform of the tth frame of the corrupted signal variance, and * designates the conjugate. As described previously, the mean can be recursively estimated and incorporated into both the frequency domain corrupted variance estimates for corrupted signals which do not have zero mean. The decision statistic can further include a noise term that is an indication of the noise in the kth frequency subband, for instance, an estimate of the power of the noise. In one example, the subband decision statistic including the noise term can be:

$$\xi_{MECC}(k,t) = 1 - \frac{\hat{r}_{em}(k,t) - \hat{\sigma}_z^2(k,t)}{\hat{\sigma}_m^2(k,t)}$$

where $\hat{\sigma}_z^2(k,t)$ is the variance of the noise in the kth subband and tth frame. In another example, the subband decision statistic including the noise term can be:

$$\xi_{MECC}(k,t) = 1 - \frac{\hat{r}_{em}(k,t) - \hat{\sigma}_z^2(k,t)}{\hat{\sigma}_m^2(k,t) - \hat{\sigma}_z^2(k,t)}.$$

By way of another example, a time domain, estimated cross-correlation decision statistic which is updated using an exponential recursive weighting algorithm can be used as the cross-correlation measure as follows:

$$P_e^2(n) = \lambda P_e^2(n-1) + (1-\lambda)e(n)e(n)$$

$$P_m^2(n) = \lambda P_m^2(n-1) + (1-\lambda)m(n)m(n)$$

$$P_{m,e}(n) = \lambda P_{m,e}(n-1) + (1-\lambda)e(n)m(n)$$

where $P_{m,e}(n)$ is the cross-correlation of the corrupted signal and the error signal, $P_e(n)$ is the standard deviation of the echo canceller's error signal, $P_m(n)$ is the standard deviation of the corrupted signal, $e(n)$ is the captured cancellation error in the time sample n and $m(n)$ is the captured corrupted signal at the time sample n and $\lambda$ is the exponential weighting factor. Since smaller values of $\lambda$ provide better tracking capability but worse estimation accuracy, for slowly time varying signals $0.9 \leq \lambda \leq 1$ can be chosen. This estimated cross-correlation decision statistic (ECC) can be given by:

$$ecc(n) = \frac{P_{m,e}(n)}{P_e(n)P_m(n)}.$$

By way of another example, a time domain, estimated cross-correlation decision statistic which indicates the maxima of the correlation in a frame and is updated using an exponential recursive weighting algorithm can be used as the cross-correlation measure as follows:

$$P_e^2(t) = \lambda P_e^2(t-1) + (1-\lambda)e(t)e^T(t)$$

$$P_m^2(t) = \lambda P_m^2(t-1) + (1-\lambda)m(t)m^T(t)$$

$$P_{m,e}(t) = \lambda P_{m,e}(t-1) + (1-\lambda)e(t)m^T(t)$$

where $P_{m,e}(t)$ is the cross-correlation of the corrupted signal and the error signal, $P_e(t)$ is the standard deviation of the echo canceller's error signal, $P_m(t)$ is the standard deviation of the corrupted signal, $e(t)$ is the captured cancellation error vector in the time frame t and $m(t)$ is the captured corrupted signal vector at the time frame t and $\lambda$ is the exponential weighting factor. Since smaller values of $\lambda$ provide better tracking capability but worse estimation accuracy, for slowly time varying signals $0.9 \leq \lambda \leq 1$ can be chosen. This estimated cross-correlation decision statistic (ECC) can be given by:

$$ecc(t) = \frac{P_{m,e}(t)}{P_e(t)P_m(t)}.$$

By way of another example, a frequency domain, estimated cross-correlation decision statistic which indicates the maxima of the correlation in a frame and is updated using an exponential recursive weighting algorithm can be used as the cross-correlation measure as follows:

$$P_e^2(k,t) = \lambda P_e^2(k,t-1) + (1-\lambda)E(k,t)E^*(k,t)$$

$$P_m^2(k,t) = \lambda P_m^2(k,t-1) + (1-\lambda)M(k,t)M^*(k,t)$$

$$P_{m,e}(k,t) = \lambda P_{m,e}(k,t-1) + (1-\lambda)|E(k,t)M^*(k,t)|$$

where $P_{m,e}(k,t)$ is the cross-correlation of the corrupted signal and the error signal, $P_e(k,t)$ is the standard deviation of the echo canceller's error signal, $P_m(k,t)$ is the standard deviation of the corrupted signal, $E(k,t)$ is the kth subband of the frequency domain transform of the tth frame of the echo cancellation error, $M(k,t)$ is the kth subband of the frequency domain transform of the tth frame of the corrupted signal vector, and * designates the conjugate. Any standard frequency domain transform can be used such as the Fast Fourier Transform (FFT) or the Modulated Complex Lapped Transform (MCLT). Since smaller values of $\lambda$ provide better tracking capability but worse estimation accuracy, for slowly time varying signals $0.9 \leq \lambda \leq 1$ can be chosen. The estimated cross-correlation decision statistic (ECC) can be given by:

$$ecc(k,t) = \frac{P_{m,e}(k,t)}{P_e(k,t)P_m(k,t)}.$$

When using these ECC decision statistic as the cross-correlation measure, cross-correlation is high whenever there is a change in the echo-path and/or when the near-end signal is present. Thus, the ECC can be compared to a threshold and when they are greater than the threshold, near-end signal and/or echo-path change can be considered present. When using the MECC decision statistic as the cross-correlation measure, the decision statistic is low (e.g., lower than a threshold value) whenever there is a change in the echo-path and/or when the near-end signal is present. Any suitable thresholds can be used, such as those determined according to the probability of miss.

Both the MECC and the ECC can be used for EC algorithms. For the case of LEC performed at the communications device (e.g., telephone), the corrupted signal is the communications device speaker, the echo is the microphone echo due to the hybrid and the reference signal is the microphone signal. The near-end signal is the speech that is transmitted to the speaker through the telephone line. The corrupted signal can contain near-end signal, microphone echo and noise. Echo-path change in the LEC case is due to changes in the impedance of the equipment.

In order to differentiate near-end signal from echo-path variations, detectors and discriminators can be used. By way of example, a signal discriminator (SD) and optionally one or more signal detectors (e.g., corrupted signal detector (CSD) or reference signal detector (RSD)) can be used to detect the presence of near-end signal as shown in FIGS. 14-15C. Although FIGS. 14-15C show a speaker and a microphone, the same principles that are discussed in reference to these figures apply to LEC as well. The detector/discriminator can be, for instance, a frequency domain logistic discriminative detector, such as a real time recurrent learning (RTRL) network that employs, for instance, stochastic gradient descent to train the network in order to minimize the cross-entropy error. Using such an error metric makes the network discriminative and provides the maximum likelihood estimate of the class probability for a wide variety of class conditional densities of the data.

Since the outputs represent probabilities, this facilitates decision making as well as the combination of decisions. The class probability can be estimated as:

$$P_t = \frac{1}{1 + \exp(-W^T \chi_t)}$$

where $P_t$ is the probability of speech at time frame t, $W^T$ are trained weights (1× frequency bins) and $\chi_t$ is a vector of extracted features in each frequency bin at the time frame t. The trained weights $W^T$ can be obtained offline using real time recurrent learning (RTRL) techniques.

It is desirable for a detector's features to be simple and easy to calculate, to have discriminatory power and to work well under changing noise conditions. For instance, the estimated posterior signal-to-noise ratio (SNR) $\chi(k,t)$ can be used as the feature set for the corrupted signal detector (CSD). The estimated posterior SNR $\chi(k,t)$ is the ratio of the energy in a given target time-frequency atom A to the noise energy N $$\chi(k, t) = \frac{|A(k, t)|^2}{N(k, t)}$$

where k,t are the frequency bin and time indices respectively. For the corrupted signal detector (CSD), the logarithm of the estimated posterior SNR of the corrupted signal can be used as the feature:

$$\chi_{CSD}(k,t) = \{\log|M(k,t)|^2 - \log N_M(k,t)\}$$

where $N_M(k,t)$ is the noise energy in frequency bin k and time-frame t of the corrupted signal, and M(k,t) is the kth bin of the frequency domain transform of the corrupted signal in time frame t. The noise energy $N_M$ can be tracked using any suitable algorithm such as by tracking the noise floor using a minima tracker (looking back a few frames (e.g., 25) for each frequency bin and choosing the lowest value of the signal) followed by smoothing. Examples of noise-tracking algorithms are described in Israel Cohen and Baruch Berdugo, "Speech Enhancement for Non-stationary Noise Environments," *Signal Processing*, vol. 81, pp 2403-2418 (2001) and R. Martin, "Spectral Subtraction Based on Minimum Statistics," Proceedings of the 7th European Signal Processing Conference, September 1994, pp. 1182-1185. In another example, the CSD can discriminate between noise and any signal such as near-end signal, echo, or doubletalk using an energy based test statistic such as:

$$\sigma_m^2 > T$$

where $\sigma_m^2$ is the variance of the corrupted signal and T is a threshold selected by offline training to achieve a specified probability of miss for a given false alarm rate.

The CSD detector indicates the presence of signal (as opposed to noise) at the microphone for AEC, which can be due to near-end signal (e.g., speech) or due to loudspeaker echo. The CSD detector indicates the presence of signal (as opposed to noise) at the speaker for LEC performed at the telephone, which can be due to near-end signal (e.g., speech) or due to microphone echo. To differentiate the near-end signal from the echo, a discriminator (SD) can be used. Any suitable discriminator can be used. For instance, the signal discriminator (SD) can be designed to determine how much of the corrupted signal is dominated by the near-end signal as opposed to the echo. To distinguish the near-end signal from the echo, features, such as the logarithm of the corrupted signal instantaneous power and the reference signal instantaneous power, can be used:

$$\chi_{SD}(k,t) = \{\log|M(k,t)|^2 - \log|X(k,t)|^2\}$$

where M(k,t) is the kth bin of the frequency domain transform of the corrupted signal in time frame t and X is the kth bin of the frequency domain transform of the reference signal in time frame t.

For the SD described above, the extracted features are typically largest for the near-end signal only case, smallest for the echo only case (i.e., echo without near-end signal), and in between for the case of doubletalk. Different feature levels correspond to different probability levels with larger features corresponding to higher probabilities. For the echo only case, testing showed that the extracted features were low independent of the echo-path; hence the discriminator is independent of the echo-path in the echo only case. Thus, since the SD features are essentially the corrupted signal subband power divided by the corresponding reference signal subband power and the echo is often small for any echo path, the SD features will not change much during an echo path change. However, this depends on the near-end to far-end ratio and the echo-path gain.

Since the MECC and the ECC decision statistics described above alone cannot distinguish near-end signal from echo only in the presence of echo-path change, the SD, the CSD, and/or the RSD can be used to distinguish the presence of near-end signal from the presence of echo only with echo-path change. By way of example, the CC shown in FIG. 14 can be implemented using the ECC decision statistic described above, and the system can control the adaptive filter(s) as follows:

1) ECC=high+SD=high+CSD=high: near-end signal is considered present and the filter(s) are prevented from adapting;
2) ECC=high+SD=low+CSD=high: echo only with echo-path change is considered present and the filter(s) are allowed to adapt;
3) ECC=low+SD=low+CSD=low: both near-end signal and echo are considered absent and the filter(s) are prevented from adapting; and
4) ECC=low+SD=low+CSD=high: echo only without echo-path change is considered present and the filter(s) are allowed to adapt.

The words "present" and "absent" are used herein to mean some likelihood or probability of the presence or the absence of a signal or echo-path change. Likewise, the terms "no" and "without" in reference to the signals are used to indicate a likelihood or a probability of the absence of a signal or echo. A similar system can be configured using the MECC decision statistic instead of the ECC, although the MECC will be high when the ECC is low and vice versa. With regard to condition 3 above, the CSD alone provides enough information to make this decision since the CSD is low whenever there is no near-end signal and no echo in the corrupted signal. Thus, the decision to allow the filters to continue to adapt because there is only noise can be based solely on the CSD. With regard to condition 2, when echo only and echo-path change are present, the information can be used to further improve the system, such as by accelerating the adaptation of the filters or switching between different EC algorithms (for instance, between a slower, more accurate algorithm and a faster less accurate algorithm).

The CC and the SD can be implemented in any suitable manner, such as by using any suitable decision statistic and an RTRL network as described above. If the ECC decision statistic is used, when the ECC is greater than its threshold and the probability of the SD is low and that of the CSD is high, echo only with echo-path change can be declared. Thus, the hybrid detector can track echo-path changes. If the MECC is used instead of the ECC, it will be low, the SD will be low and the CSD will be high in the presence of echo only with echo-path change.

Figure 15B:
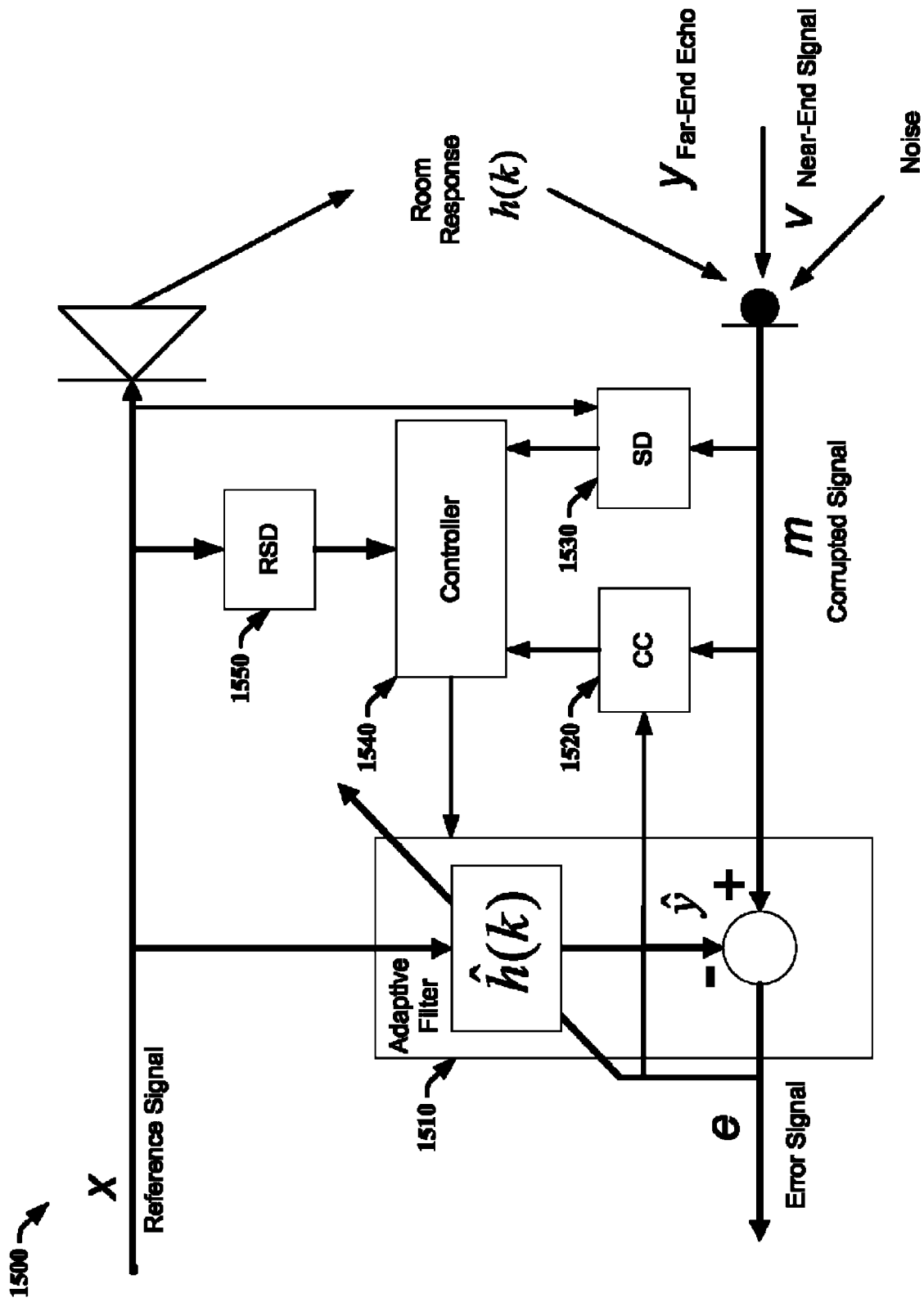
Figure 15C:
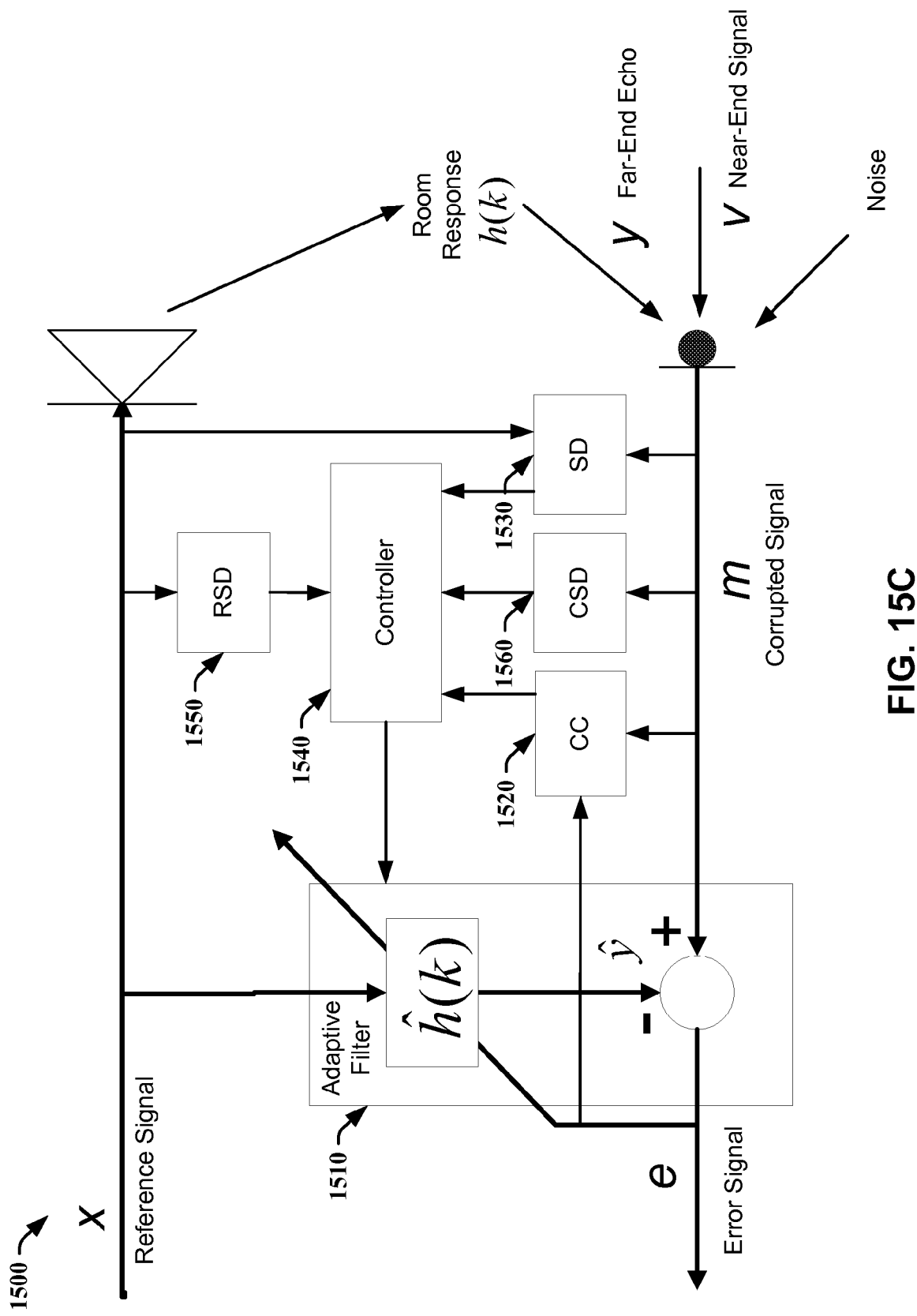

By way of another example, a reference signal detector (RSD) can be used in place of the CSD as shown in FIG. 15B. Any suitable RSD can be used. For instance, the RSD can use the reference signal X as the target signal and the logarithm of the SNR estimate rather than the SNR estimate itself can be used as the input to a RTRL network:

$$\chi_{RSD}(k,t) = \{\log|X(k,t)|^2 - \log N_X(k,t)\}$$

where $N_X$ is the noise energies in frequency bin k and time-frame t of the reference signal. The noise power N can be tracked using any suitable algorithm such as those described above. In another example, the RSD can discriminate between noise and any reference signal using a energy based test statistic such as:

$$\sigma_x^2 > T$$

where $\sigma_x^2$ is the variance of the reference signal and T is a threshold select by offline training to achieve a specified probability of miss for a given false alarm rate. A system having the ECC as the CC can, for instance, control the adaptive filter(s) according to the following conditions:
1) ECC=high+SD=high+RSD=high: most likely near-end signal and echo present, although the echo could be very weak. The filter(s) can be prevented from adapting during this condition;
2) ECC=high+SD=high+RSD=low: near-end signal only is considered present. The filter(s) can be prevented from adapting;
3) ECC=high+SD=low+RSD=high: echo with echo-path change is considered present and near-end signal is considered absent. The filter(s) can be allowed to adapt;
4) SD=low+RSD=low: both near-end signal and echo are considered absent (only noise present). The filter(s) can be prevented from adapting; and
5) ECC=low+SD=low+RSD=high: echo without echo-path change is considered present and near-end signal is considered absent. The filter(s) can be allowed to adapt.

A similar system can be configured using the MECC decision statistic instead of the ECC, although the MECC will be high when the ECC is low and vice versa.

By way of yet another example, a reference signal detector (RSD) can be used along with the CSD, SD and CC as shown in FIG. 15C. Any suitable CSD, RSD, SD and CC can be used such as those described above. Moreover, a second cross-correlation measure can be used as an SD in order to discriminate near-end signal from echo in the corrupted signal.

By way of another example, a learner that combines multiple decisions (e.g., CSD and SD or RSD and SD or CSD, RSD and SD) into one can be used in the systems described above. For example, a RTRL network can be trained to indicate the presence of a near-end signal when the input features for the network are the outputs of the CSD and SD networks. The CSD, SD and CC can be configured in any suitable way, such as the ways described above. For instance, the CC can be implemented using ecc(k,t) or $\xi_{MECC}(k,t)$ in comparison to a threshold and the CSD and SD can be implemented to compute a probability and the probabilities can be compared to a threshold. The threshold for the SD can be selected, for instance, based on the probability of miss of the near-end signal. By way of example, the SD threshold can be selected so that the probability of miss of the near-end signal is some specified level. The threshold for the CSD can be selected using offline training to discriminate noise only from other conditions (e.g., near-end signal, echo only, doubletalk). By way of another example, the SD and CC thresholds can be jointly selected in order to achieve an overall probability of miss for the near-end signal. For instance, test all combinations of threshold values for both the SD and the CC ranging from 0 to 1 and choose the combination of thresholds that yield the lowest probability of miss for a given false alarm constraint. Similarly, thresholds for the three components (e.g., CC, SD and CSD) or four (e.g., CC, SD, CSD and RSD) components can be selected together.

Figure 17:
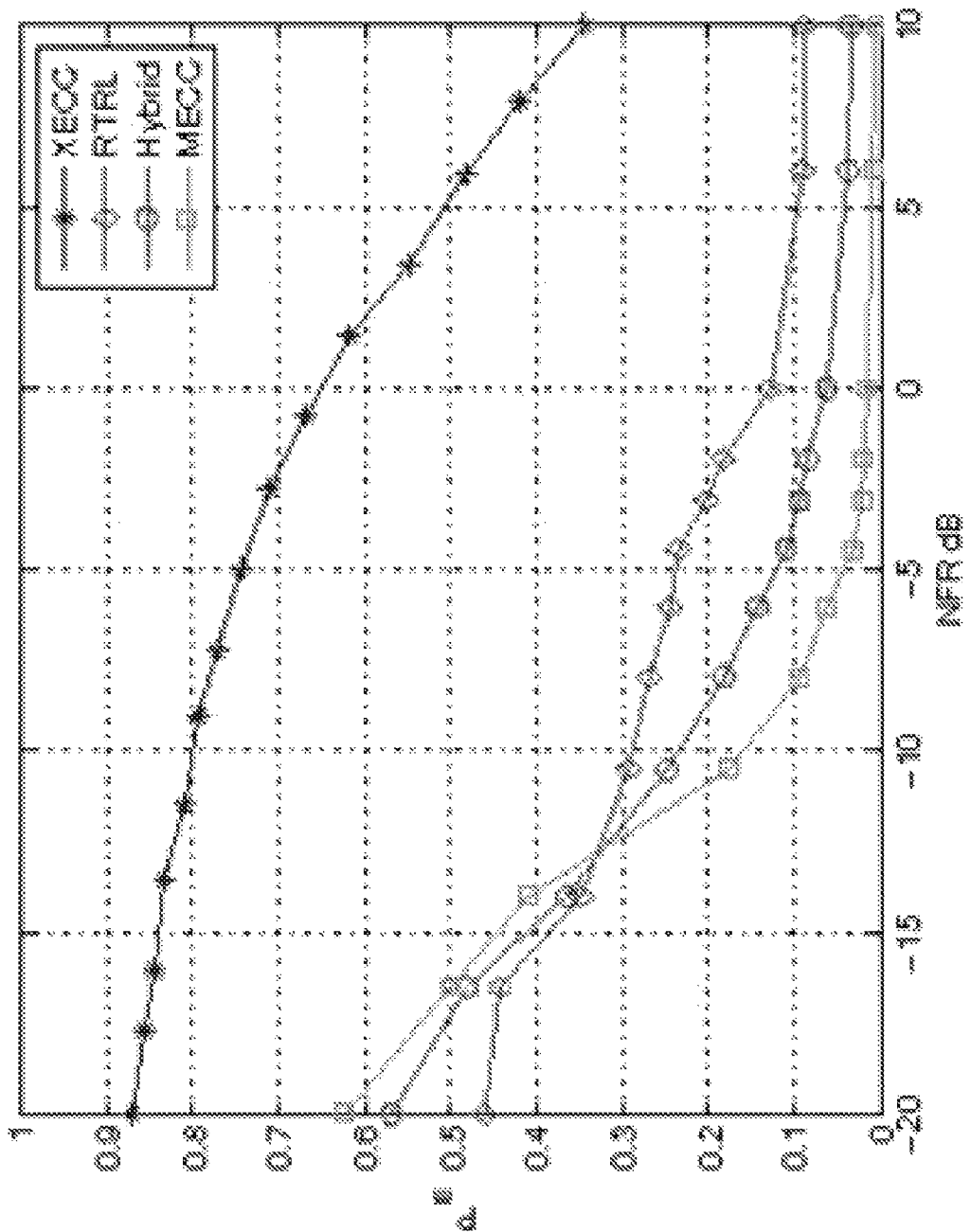
FIG. 17 is a graph showing the performance of the MECC, XMCC, RTRL and Hybrid detectors (acronyms explained below).

The performance of the hybrid detector shown in FIG. 14 to detect near-end signal is shown in FIG. 17. To assess the performance, simulations were performed and performance characterized in terms of the probability of miss ($P_m$) as a function of near-end to far-end ratio (NFR) under a probability of false alarm ($P_f$) constraint. The probability of miss ($P_m$) is the probability of not detecting (miss) double-talk when it is present. Thus, a smaller value of $P_m$ indicates better performance.

Recorded digital speech sampled at 16 KHz was used as reference signal x and near-end signal v and a measured L=8000 sample (500 ms) room impulse response of a 10'×10'×8' room was used as the loudspeaker-microphone environment h. The hybrid detector was compared to a conventional cross-correlation (XECC) based double-talk detector as well as to an RTRL based double-talk detector (described in U.S. patent application Ser. No. 11/669,549).

As can be seen in FIG. 17, the hybrid and the MECC algorithms significantly outperform the XECC over a full-range of NFR values. As can also be seen from the results, the performance of the MECC is similar to that of the XMCC. However, as explained above, the MECC is computationally very efficient, is insensitive to echo-path variations and the detection threshold is independent of the data. Echo-path changes were not included in this testing. If echo-path changes had been included in the testing, the hybrid detector would allow the EC to adapt when the echo-path changes occurred. It is desirable for the EC to adapt during periods of echo-path changes in the absence of near-end signal.

Figure 18:
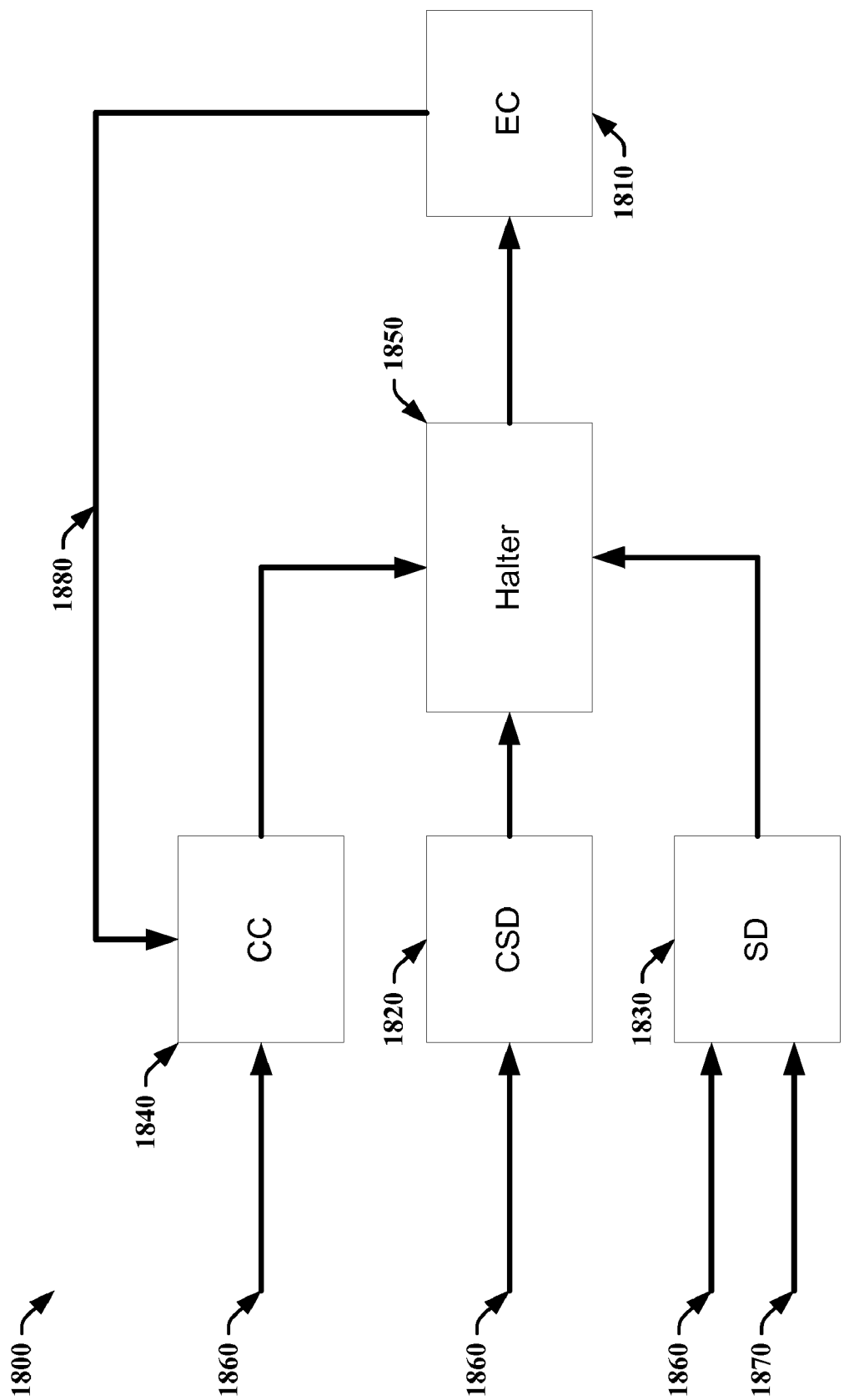
FIG. 18 is a block diagram of another example of a system for controlling an EC.

FIG. 18 is a block diagram of one example of a system 1800 for controlling an echo canceller (EC) 1810. The system 1800 includes a corrupted signal detector (CSD) 1820, a signal discriminator (SD) 1830, a cross-correlator (CC) 1840 and a halter 1850. The CSD 1820 is configured to detect the presence of a signal other than noise in the corrupted signal 1860. The SD 1830 is configured to discriminate between near-end signal and reference signal echo 1870 in the corrupted signal 1860. The CC 1840 is configured to cross-correlate the corrupted signal 1860 and the error signal 1880 of the echo canceller 1810. The halter 1850 is configured to halt adaptation of the EC 1810 if the CSD 1820 indicates noise only in the corrupted signal 1860 or the presence of signal other than noise in the corrupted signal 1860 and the SD 1820 and the CC 1840 indicate the presence of near-end signal in the corrupted signal 1860. The system 1800 can be implemented in any suitable manner, such as any of the ways described above. For instance the CC 1840 can be configured to employ a decision statistic (e.g., time domain decision statistic, frequency domain decision statistic, overall decision statistic) and the CSD 1820 and the SD 1830 can be configured to employ real time recurrent learning networks to detect and discriminate. The CSD also can be configured to discriminate noise from signal including near-end signal, echo, and doubletalk using an energy based test statistic. The CSD, SD and CC described above can be implemented by software or combinations of software and hardware and can be the same process executing on a single or a plurality of microprocessors or multiple processes executing on a single or a plurality of microprocessors.

Figure 19:
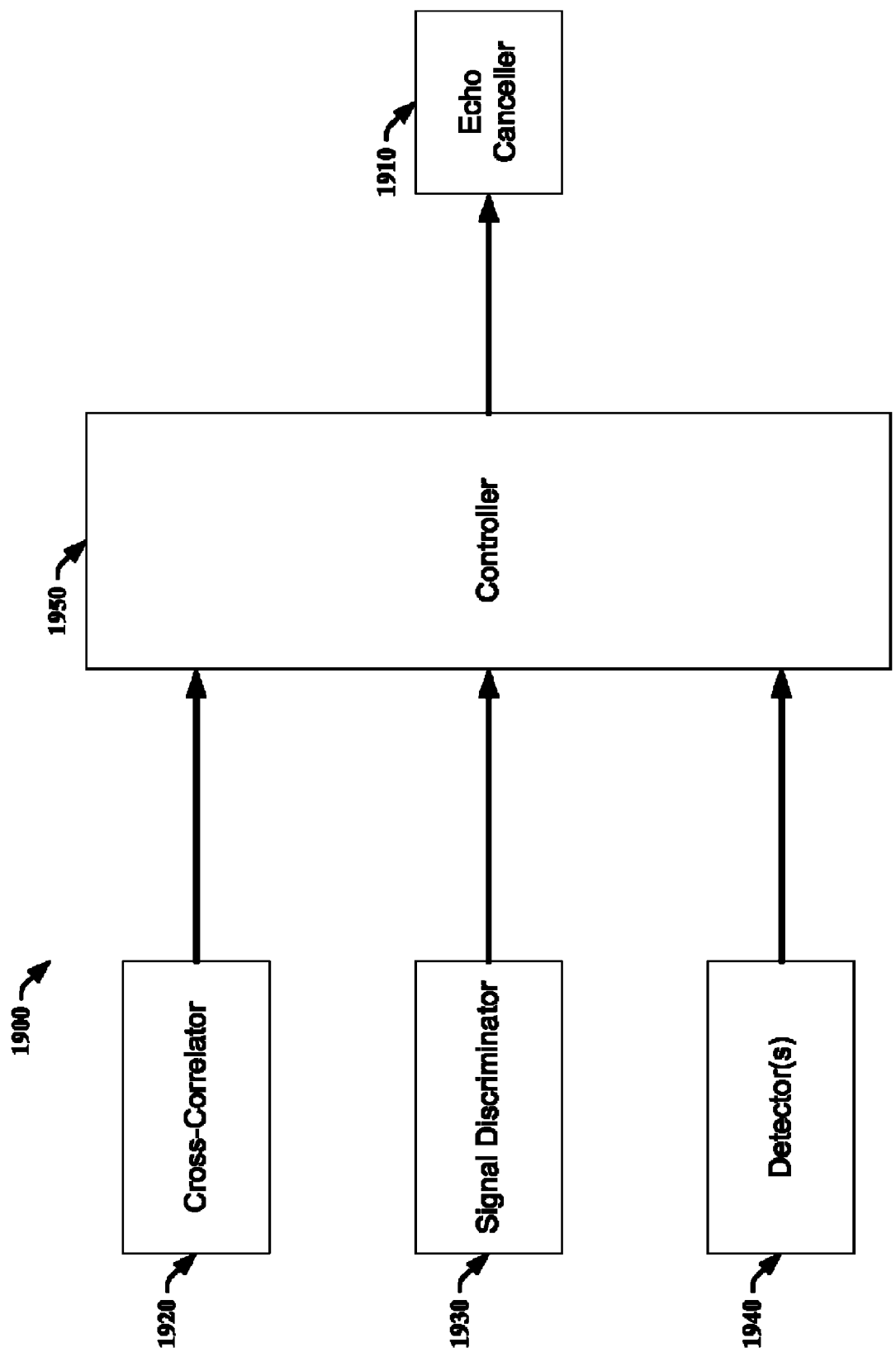
FIG. 19 is a block diagram of another example of a system for controlling an EC.

FIG. 19 is a block diagram of another example of a system 1900 for controlling an echo canceller (EC) 1910. The system 1900 includes a cross-correlator 1920, a signal discriminator 1930, one or more detectors 1940 and a controller 1950. The cross-correlator 1920 is configured to utilize cross-correlation to produce an output indicative of the presence of near-end signal or the presence of echo only (no near-end signal) with echo-path change in a corrupted signal. Near-end signal includes but is not limited to speech. In the case of AEC, echo-path change indicates a variation of the acoustic path from the speaker to the microphone in the near-end room. The signal discriminator 1930 is configured to produce an output that distinguishes between the presence of near-end signal and the presence of echo in the corrupted signal. The one or more detectors 1940 are configured to produce an output that detect any signal in either the corrupted signal or the reference signal other than noise. The one or more detectors 1940 can be implemented by a plurality of detectors such as the CSD and the RSD described above. The cross-correlator 1920, signal discriminator 1930 and the detector(s) 1940 described above can be implemented by software or combinations of software and hardware and can be the same process executing on a single or a plurality of microprocessors or multiple processes executing on a single or a plurality of microprocessors.

The controller 1950 is configured to control adaptation of the echo canceller 1910 according to the outputs of the cross-correlator 1920, signal discriminator 1930 and the one or more detectors 1940. The system 1900 can be implemented in any suitable manner, such as in any of the ways described above. By way of example, the cross-correlator 1920 can be implemented as a time domain or a frequency domain cross-correlator, for instance by employing a decision statistic. Two examples of suitable decision statistics are ecc(k,t) and $\xi_{MEC-c}(k,t)$ described above. The decision statistic can be based at least in part on a noise signal, can be based on estimates and/or can be an overall decision statistic. By way of yet another example, the signal discriminator 1930 and the one or more detectors 1940 can be real time recurrent learning networks or energy based.

Figure 20:
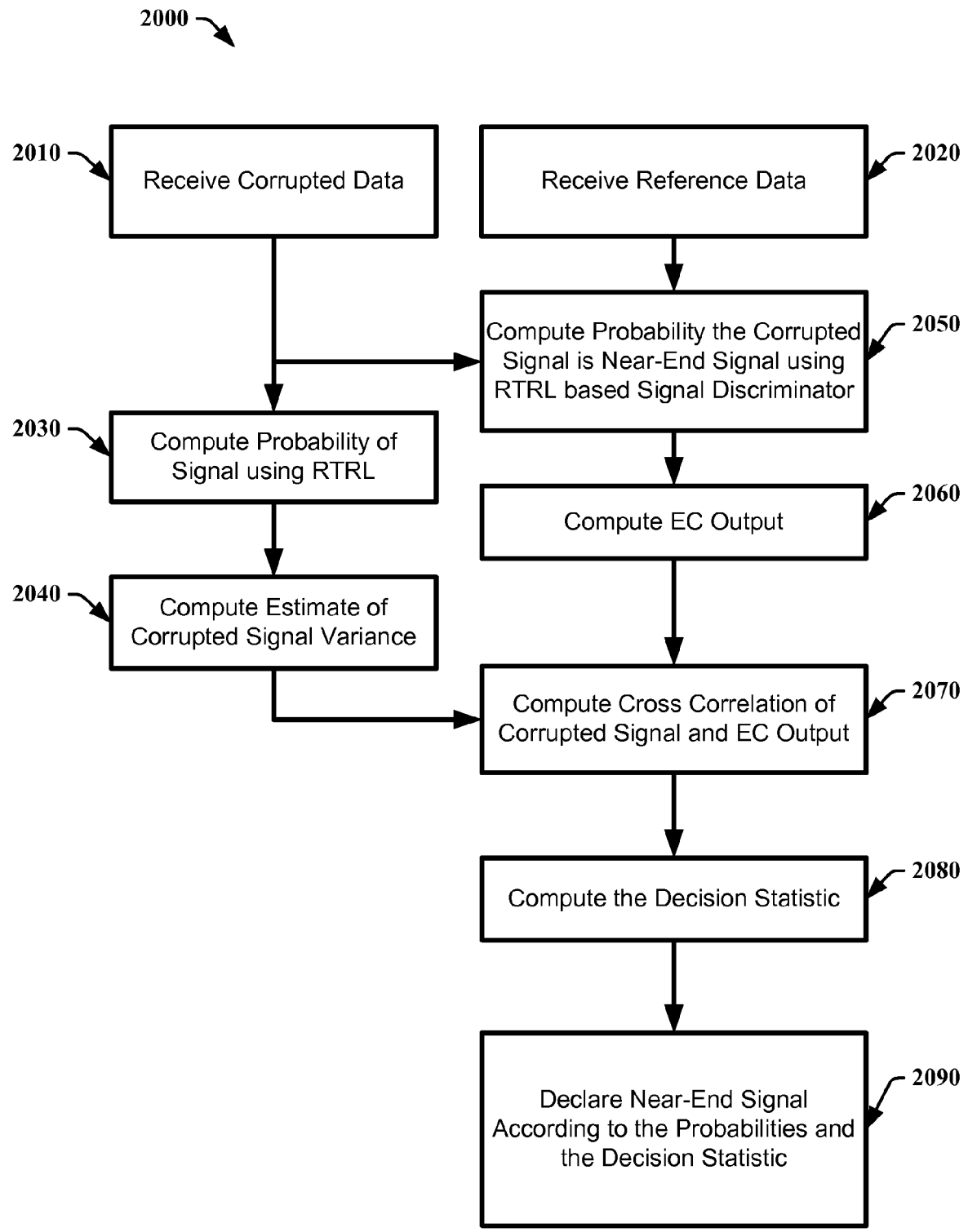
FIG. 20 is a flow diagram of an example of a method for declaring a near-end signal.

FIG. 20 is a flow diagram of one example of a method 2000 of declaring a near-end signal present in a microphone signal. At steps 2010 and 2020, corrupted data and reference data are received. The probability of a signal being in the corrupted data (as opposed to only noise) is computed at step 2030 and at step 2040, the corrupted signal variance is estimated. At step 2050, the probability that a near-end signal is contained in the corrupted data is computed using real time recurrent learning (RTRL) techniques. The EC output, or error signal, is computed at step 2060 and at step 2070, cross-correlation of the corrupted signal and the EC output, or error signal, is computed. The decision statistic is computed at step 2080 and near-end signal is declared according to the decision statistic and the probabilities at step 2090. Steps 2010 and 2020 can occur in parallel or in any sequence as can steps 2030-2060. The method 2000 can be implemented using an energy based decision statistic rather than a RTRL probability.

Figure 21:
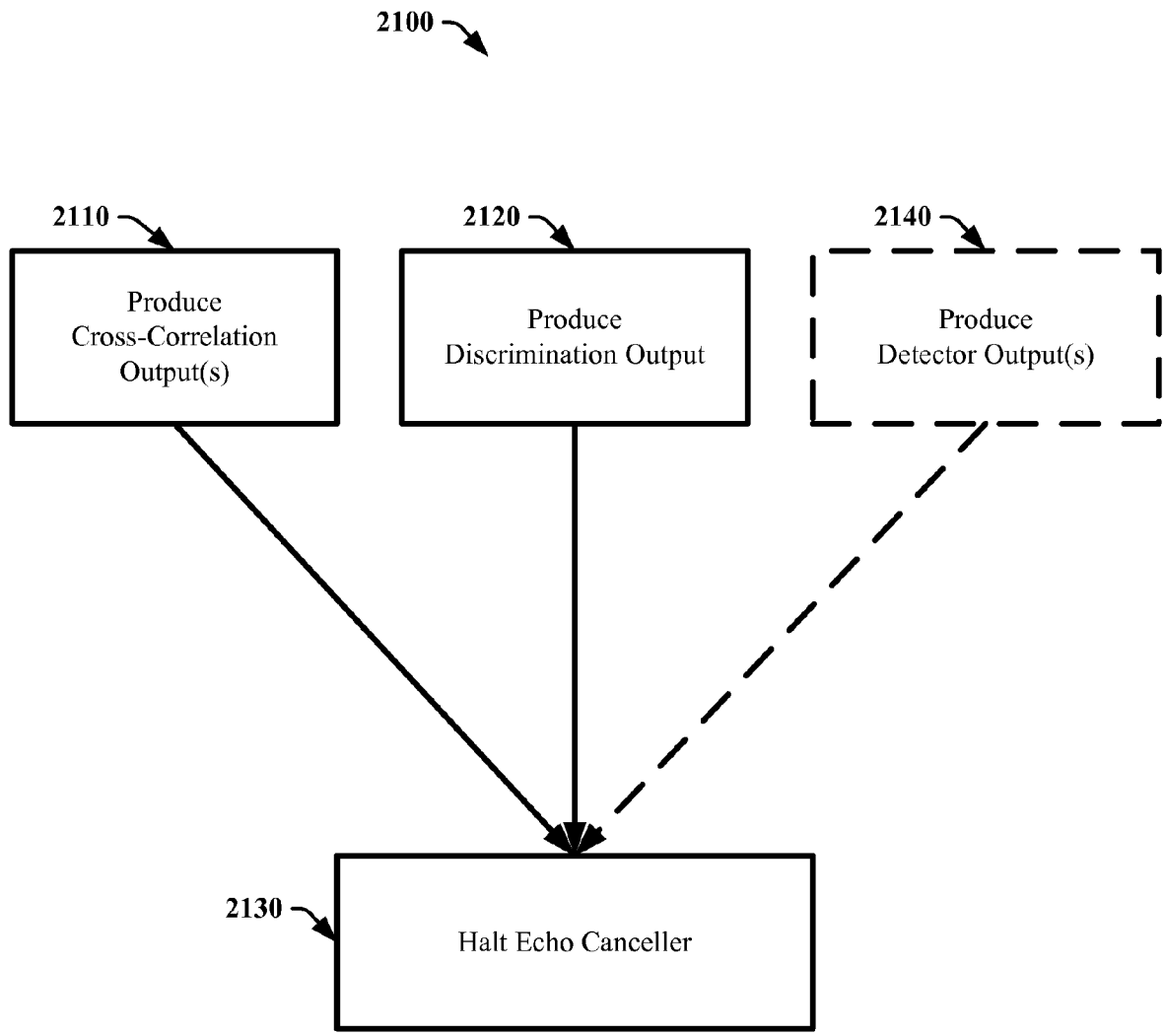
FIG. 21 is a flow diagram of another example of a method for controlling an EC.

FIG. 21 is a flow diagram of another example of a method 2100 of controlling an echo canceller. At step 2110, a cross-correlation based output is produced and at step 2120, a discrimination output is produced. Steps 2110 and 2120 can be performed in any sequential order or in parallel. At step 2130, the echo canceller is controlled according to the cross-correlation based output and the discrimination output. The method 2100 can optionally include the step 2140 of producing one or more detector outputs.

The steps of the method 2100 can be performed in any suitable manner such as in any of the ways described above or below. By way of example, step 2110 can be performed in either the time domain or the frequency domain. The cross-correlation based output can be an estimated cross-correlation output and can be, for instance, produced by computing a decision statistic. By way of another example, the discrimination output and detector output(s) produced can be probabilities and can be based at least in part on machine learning (e.g., produced by one or more real time recurrent learning networks). By way of yet another example, step 2130 can be accomplished by comparing a decision statistic to its corresponding threshold and comparing the one or more probabilities to their corresponding thresholds and halting the echo canceller according to the results of the comparison.

Figure 22:
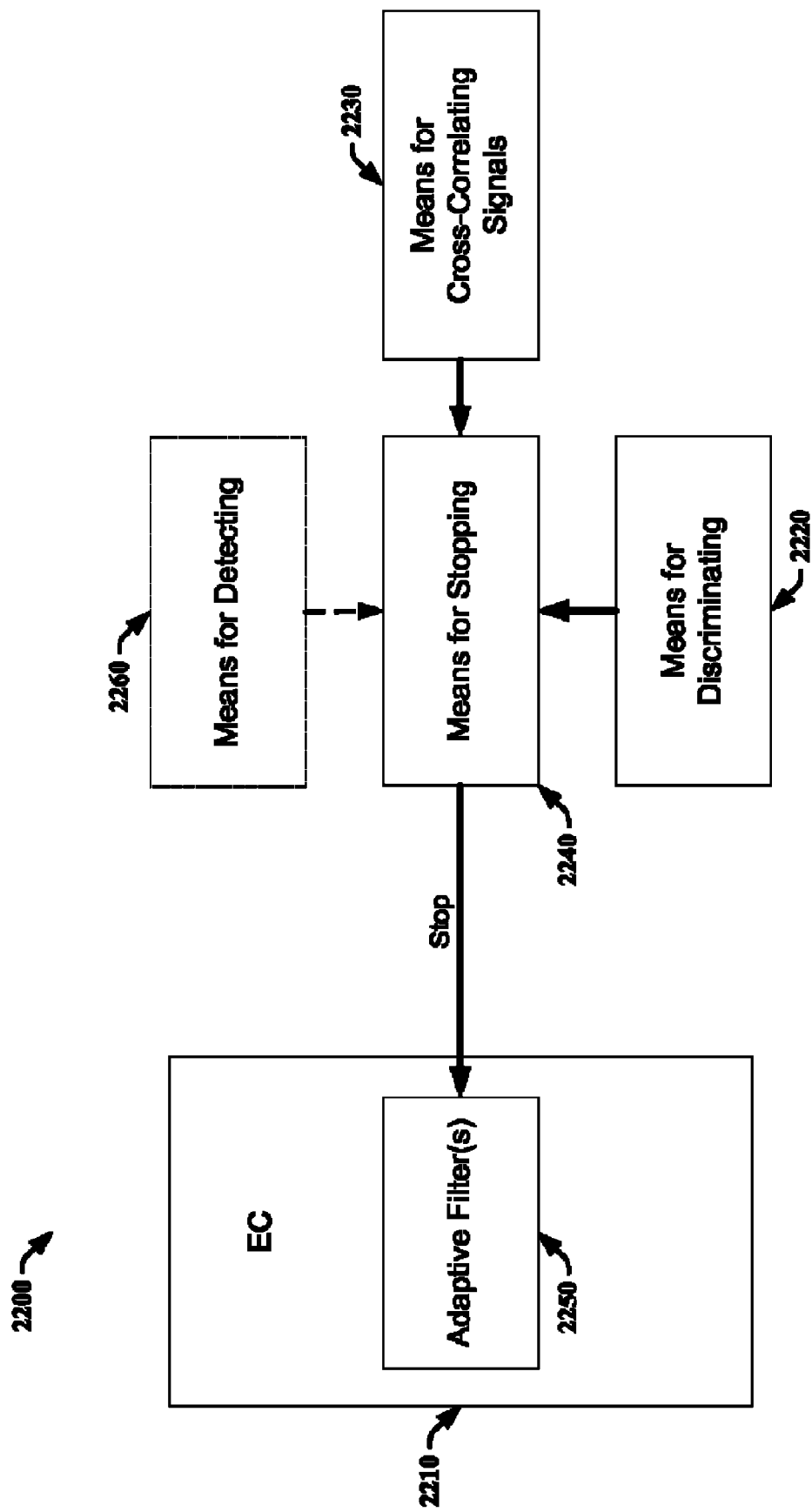
FIG. 22-29 are block diagrams of other examples of a system for controlling an EC.
Figure 23:
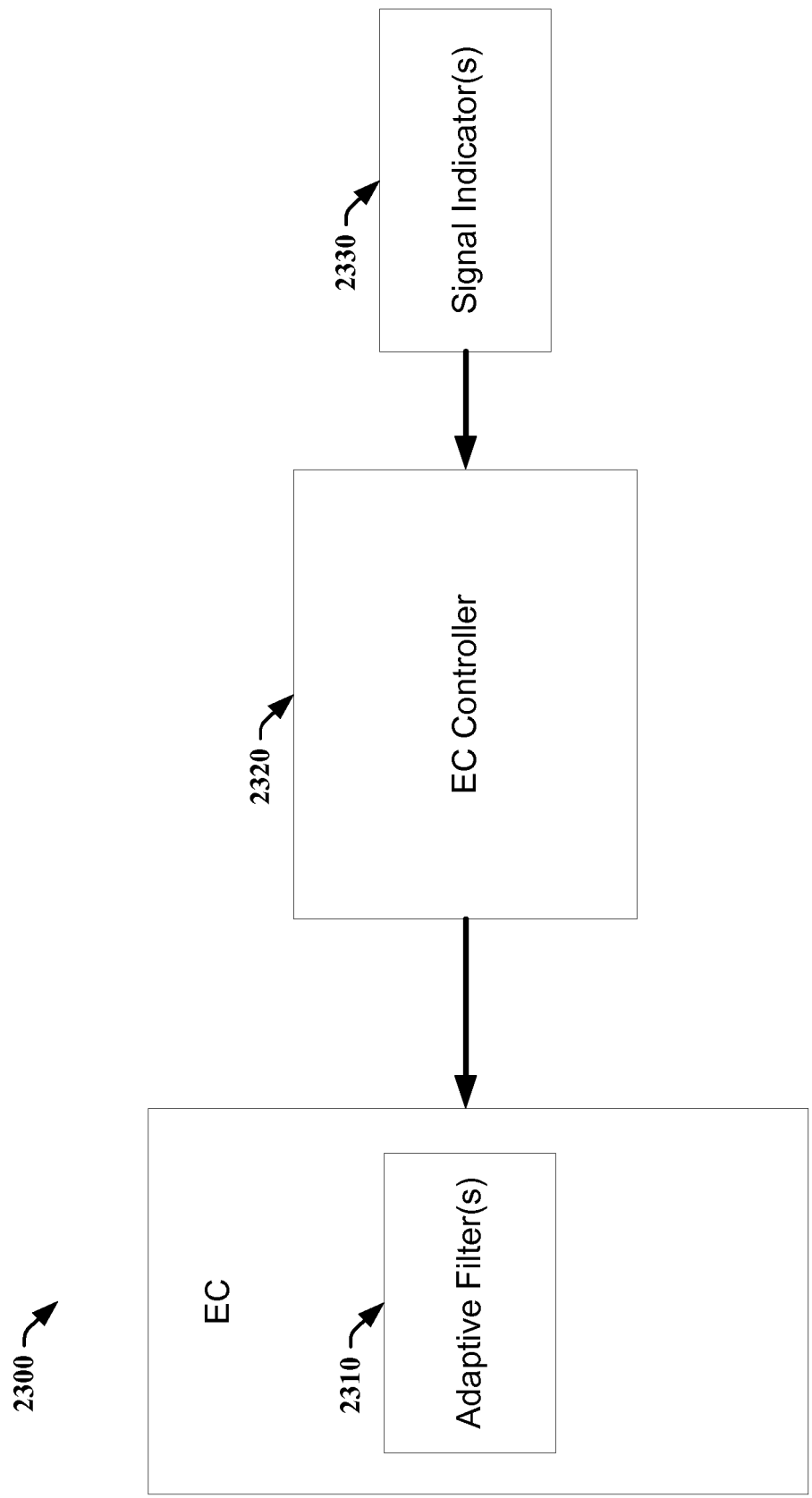

FIG. 22 is another example of a system 2200 for controlling an echo canceller (EC) 2210. The system 2200 includes a means for determining 2220 whether a near-end signal is present in a corrupted signal, a means for cross-correlating 2230 two signals, and a means for stopping 2240 one or more adaptive filters 2250 of the echo canceller 2210 from adapting based on the presence of near-end signal and the cross-correlation. The system 2200 optionally can include a means for detecting 2260. The EC 2210, means for determining 2220, means for cross-correlating 2230 and means for stopping 2240 can be implemented in any suitable manner, such as in any of the ways described above or below. By way of example, the means for cross-correlating 2230 can be implemented using an ECC, MECC, XMCC, or XECC algorithm and can be implemented in either the time domain or the frequency domain, such as by using a decision statistic. The decision statistic can be an individual or an overall decision statistic. In the case of the former, each of the one or more adaptive filters 2250 can be stopped according to an individual decision statistic (e.g., at a frequency bin level). In the case of the latter, the overall decision statistic can reflect some number of the individual decision statistics (e.g., all or some or most or a few) and all of the adaptive filters can be stopped according to the overall decision statistic. One example of an overall decision statistic is configured to stop the one or more adaptive filters when half or more of the individual decision statistics meet some criteria, for instance, when half or more of the individual statistics exceed their prescribed thresholds.

By way of another example, the means for discriminating 2220 can be implemented by using a signal discriminator (SD) and the means for detecting can be implemented by a corrupted signal detector (CSD) as described above. By way of yet another example, the means for stopping 2240 can be implemented using prescribed thresholds as described above. The means described above can be implemented by software or combinations of software and hardware and can be the same process executing on a single or a plurality of microprocessors or multiple processes executing on a single or a plurality of microprocessors.

FIGS. 23-29 are block diagrams of examples of various configurations of systems for controlling an echo canceller (EC) having associated signals (e.g., a corrupted signal, a reference signal and an error signal). The systems include a signal indicator and an echo canceller controller. The signal indicator can be configured to indicate at least one or more of the following conditions in the corrupted signal based at least in part on the cross-correlation of two of the signals associated with the EC (e.g., the corrupted signal and the error signal):

1) near-end signal;
2) echo only with echo-path change;
3) echo only without echo-path change; and/or
4) noise only (no near-end signal and no echo).

Additionally or alternatively, the signal indicator also can be configured to detect noise only in the reference signal.

The signal indicator can include, for instance, one or more cross-correlators (CC), one or more signal discriminators (SD) and optionally one or more detectors (D). The CC(s) can be configured to produce an indication based on cross-correlating two of the signals associated with the EC. The SD(s) can be configured to produce an indication of whether near-end signal or echo is present in the corrupted signal. The D(s) can be configured to produce an indication of whether noise only is present in the corrupted signal or in the reference signal. The cross-correlators, the discriminators and the detectors can be implemented in any suitable manner, such as at a frequency bin level or the CCs can be configured at the frequency bin level and the SD and D(s) can be implemented at the frame level. The signal indicator can be configured entirely in the time domain and have one CC, one SD and one D. The signal indicator can be configured to have at least two CCs that do not cross-correlate the same two signals associated with the EC (e.g., each CC cross-correlates at least one different signal associated with the EC, for instance, one CC cross-correlates the corrupted signal and the error signal and another CC cross-correlates the reference signal and the error signal).

The EC Controller can be configured to control the EC according to the indications of the signal indicator. By way of example, the EC Controller can employ decision statistics (e.g., individual or overall) to control the EC. By way of example, if the indications from the signal indicator indicate that the current period of the corrupted signal is a period of near-end signal, the EC Controller can, for instance, prevent at least one of the EC's one or more adaptive filters from adapting. If the indications from the signal indicator indicate that the current period of the corrupted signal is a period of echo only with echo-path change, the EC Controller can, for instance, allow the at least one of the EC's one or more adaptive filters to adapt, accelerate adaptation or switch to another echo canceller algorithm. If the indications indicate a period of no near-end signal and no echo (noise only), the EC Controller can, for instance, prevent at least one of the EC's adaptive filters from adapting. If the indications indicate a period of echo only without echo-path change, the EC Controller can, for instance, allow at least one of the echo canceller's one or more adaptive filters to adapt.

Figure 24:
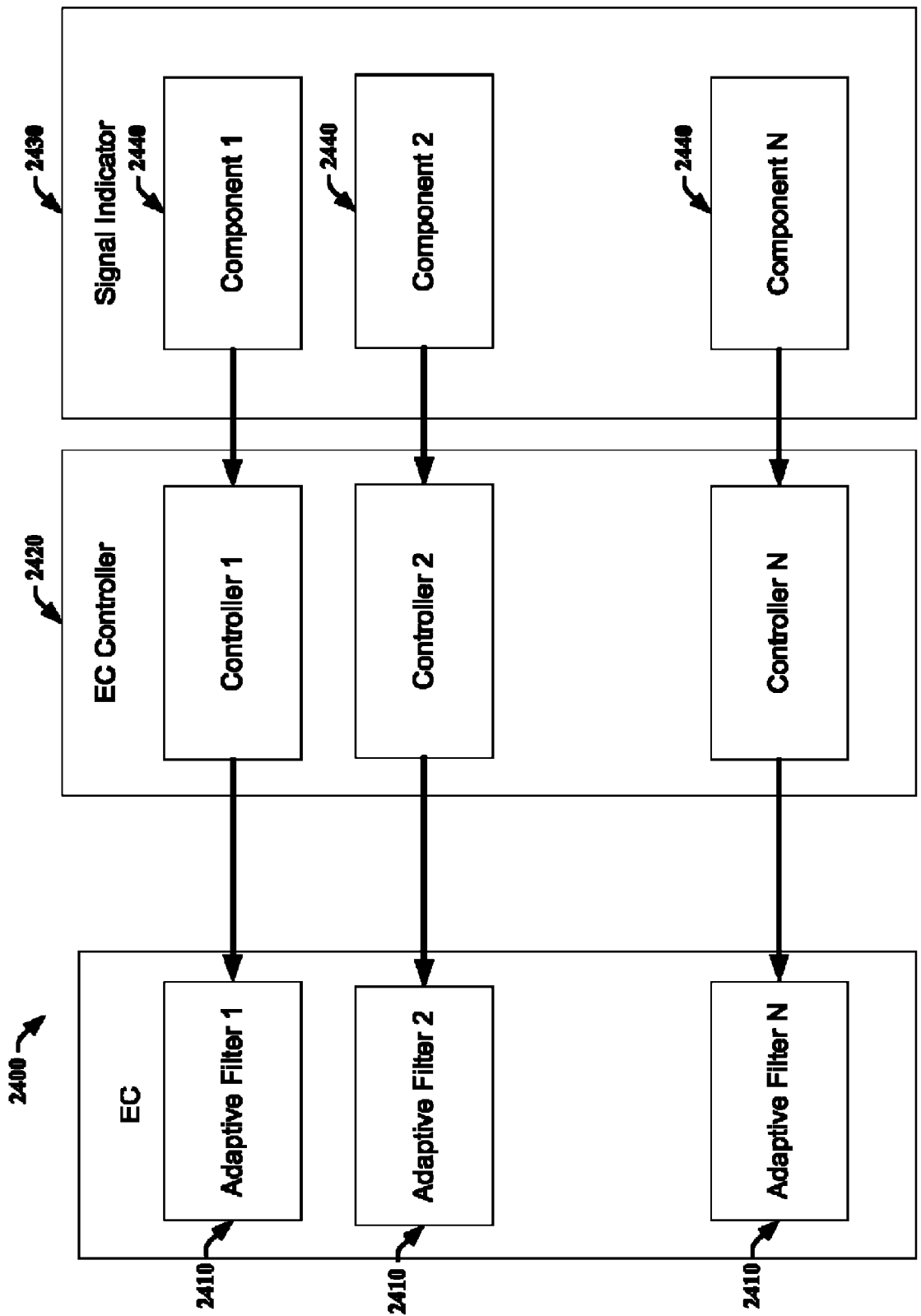
Figure 25:
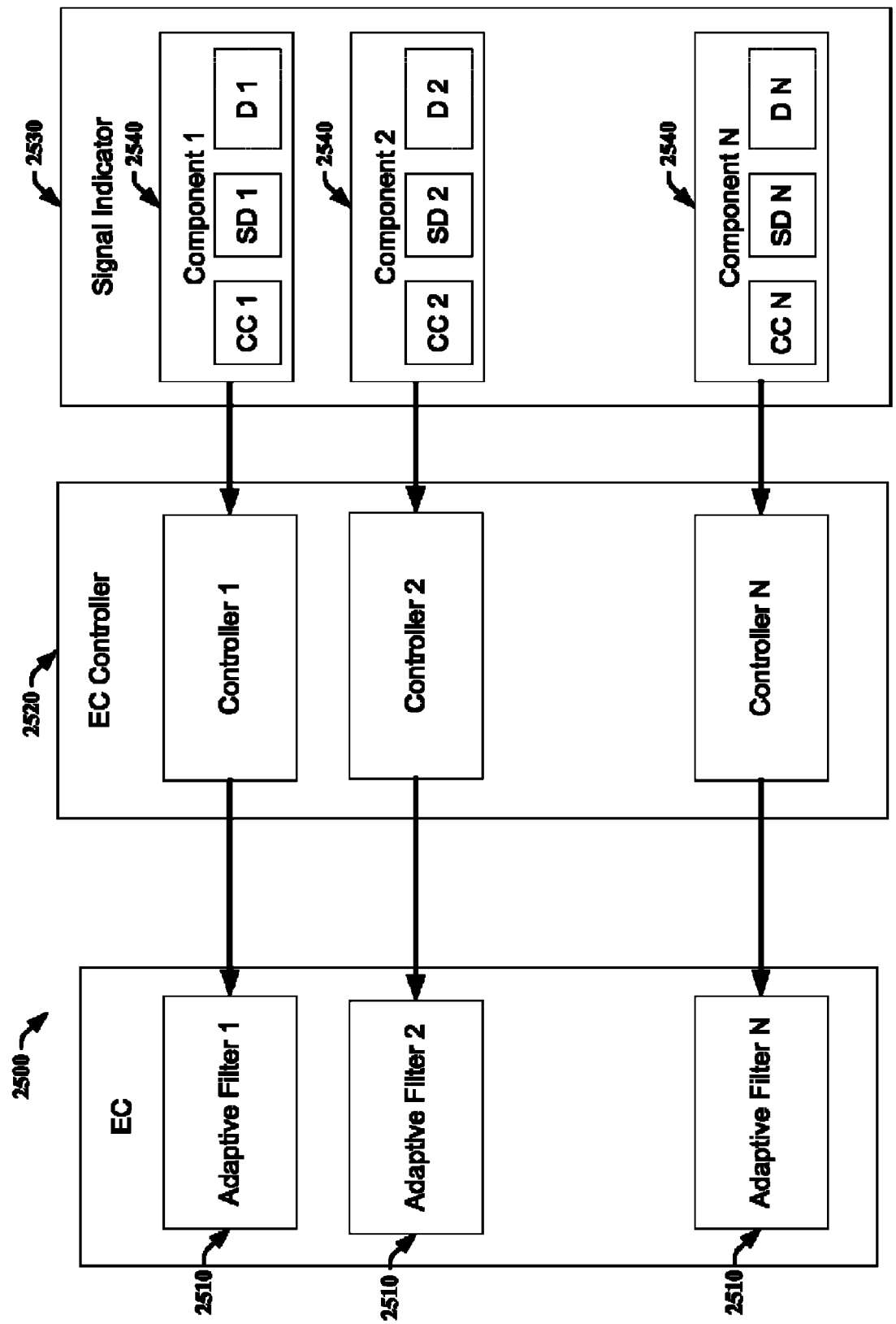
Figure 26:
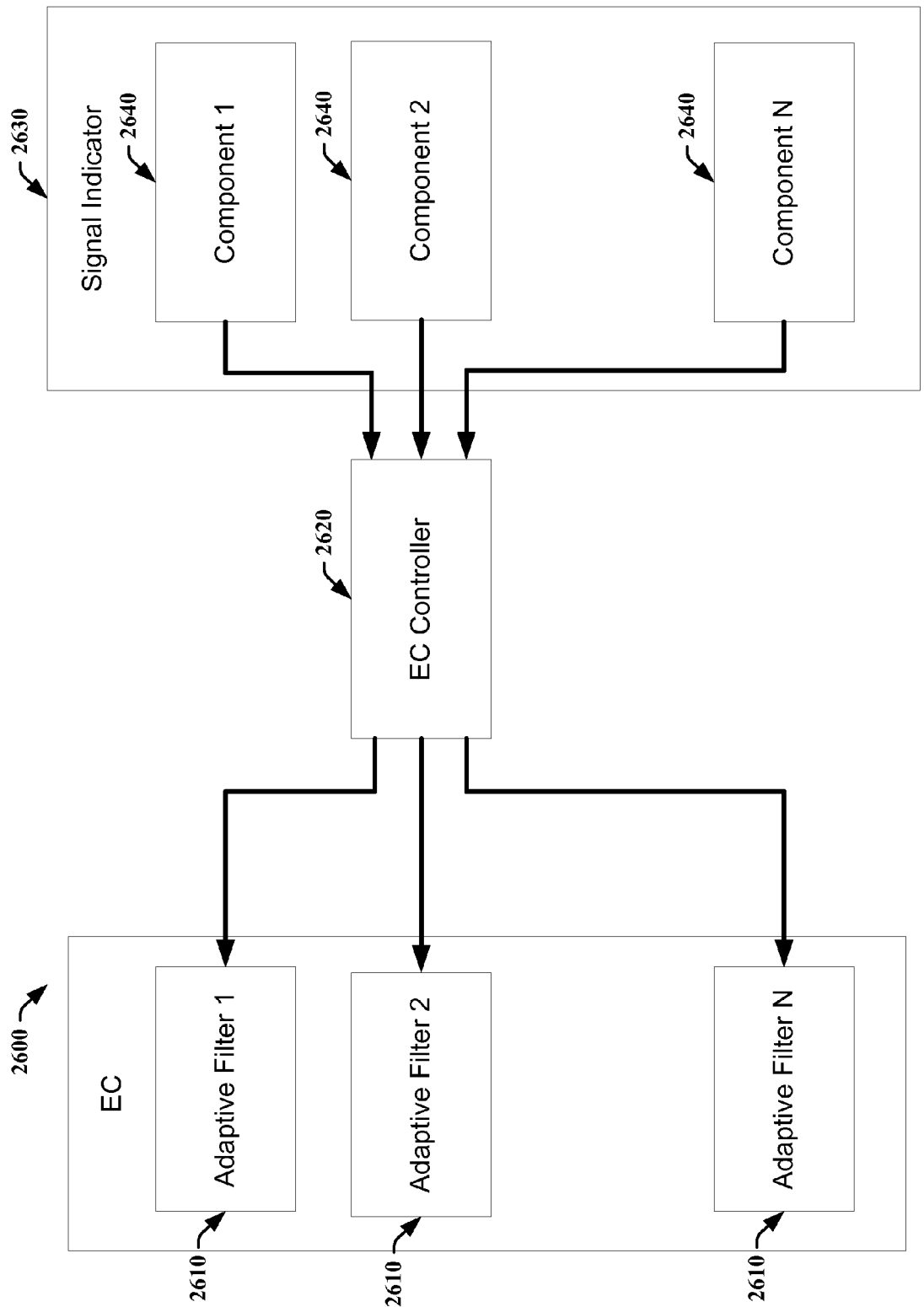
Figure 27:
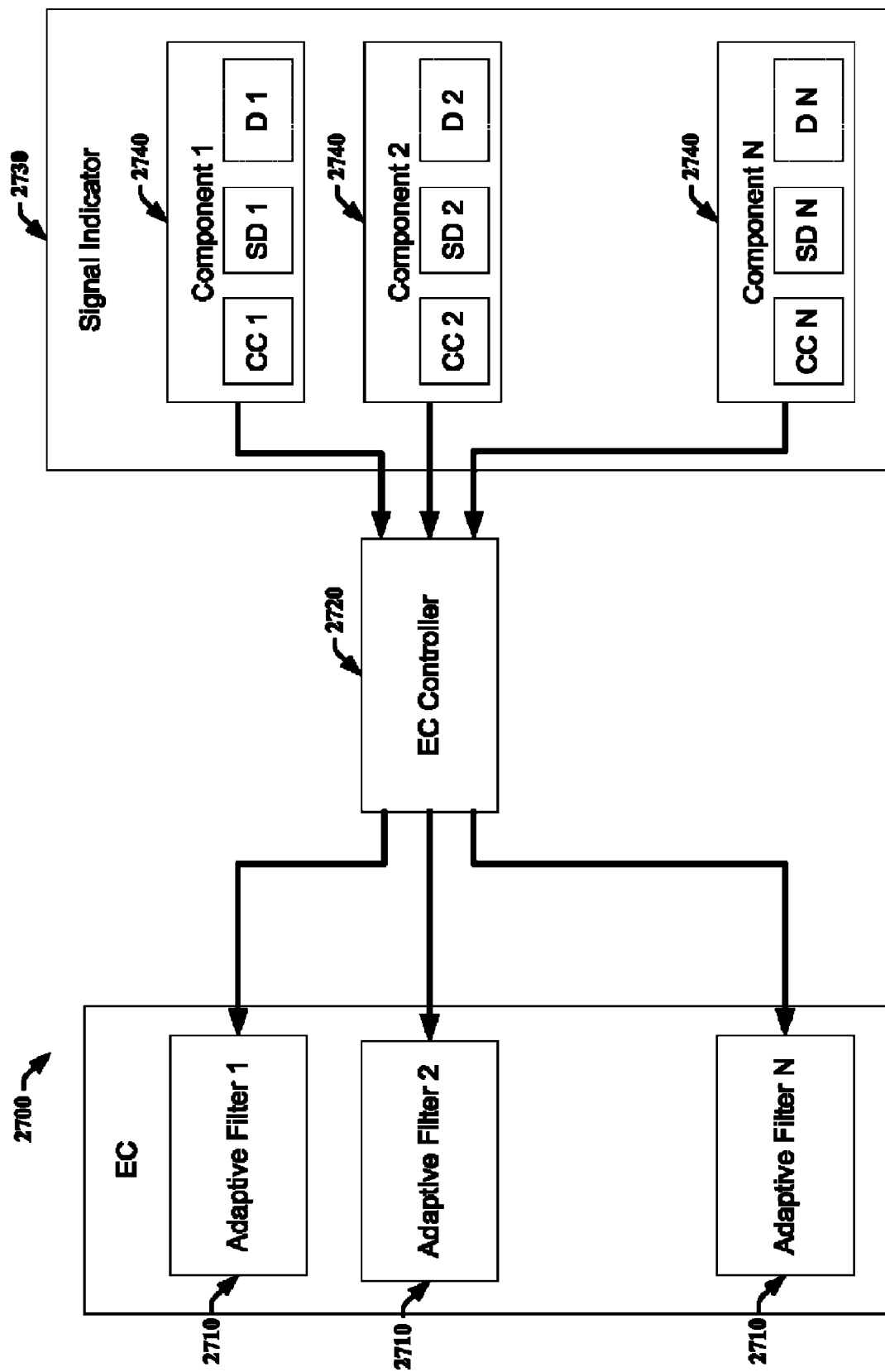
Figure 28:
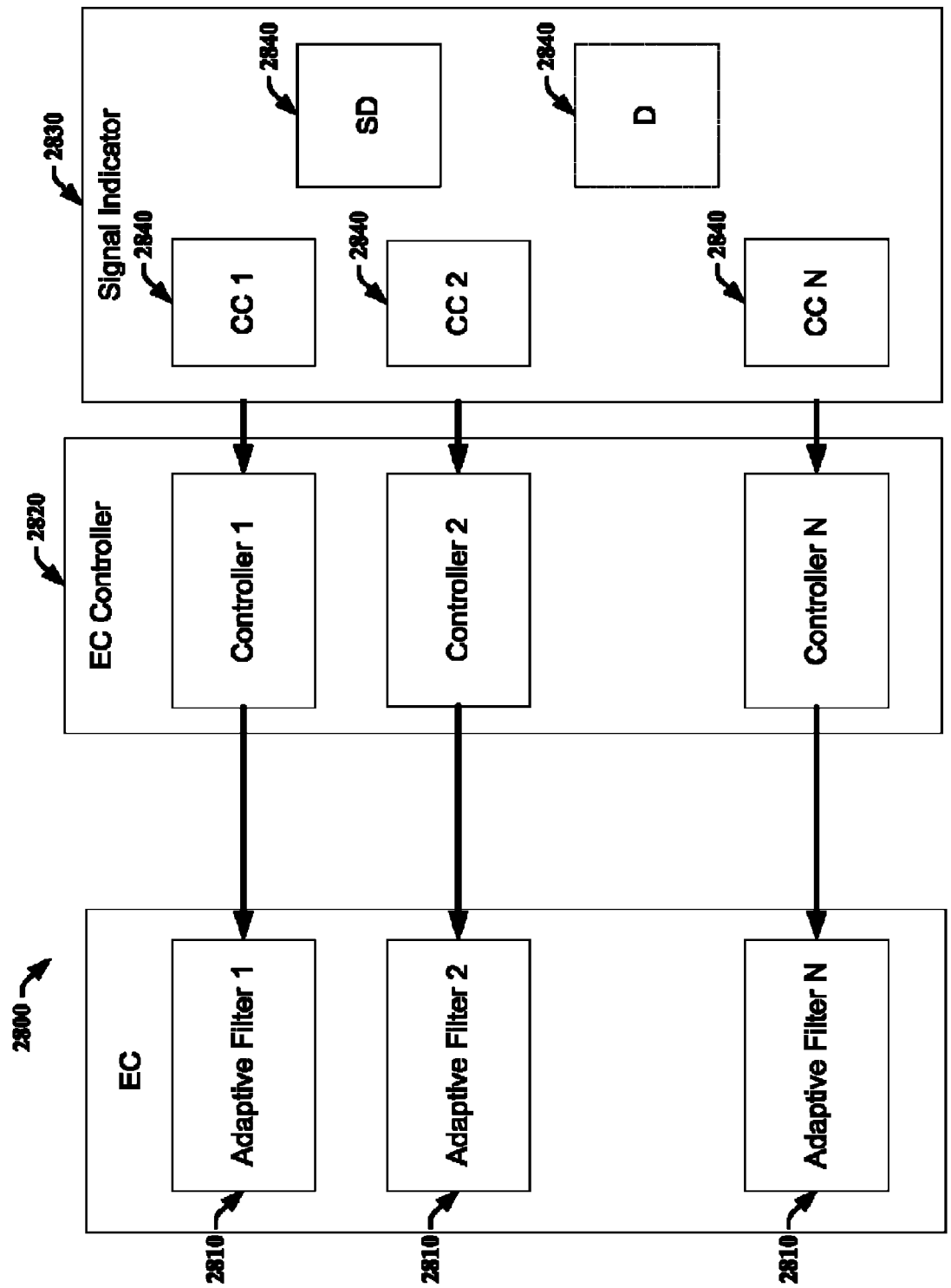
Figure 29:
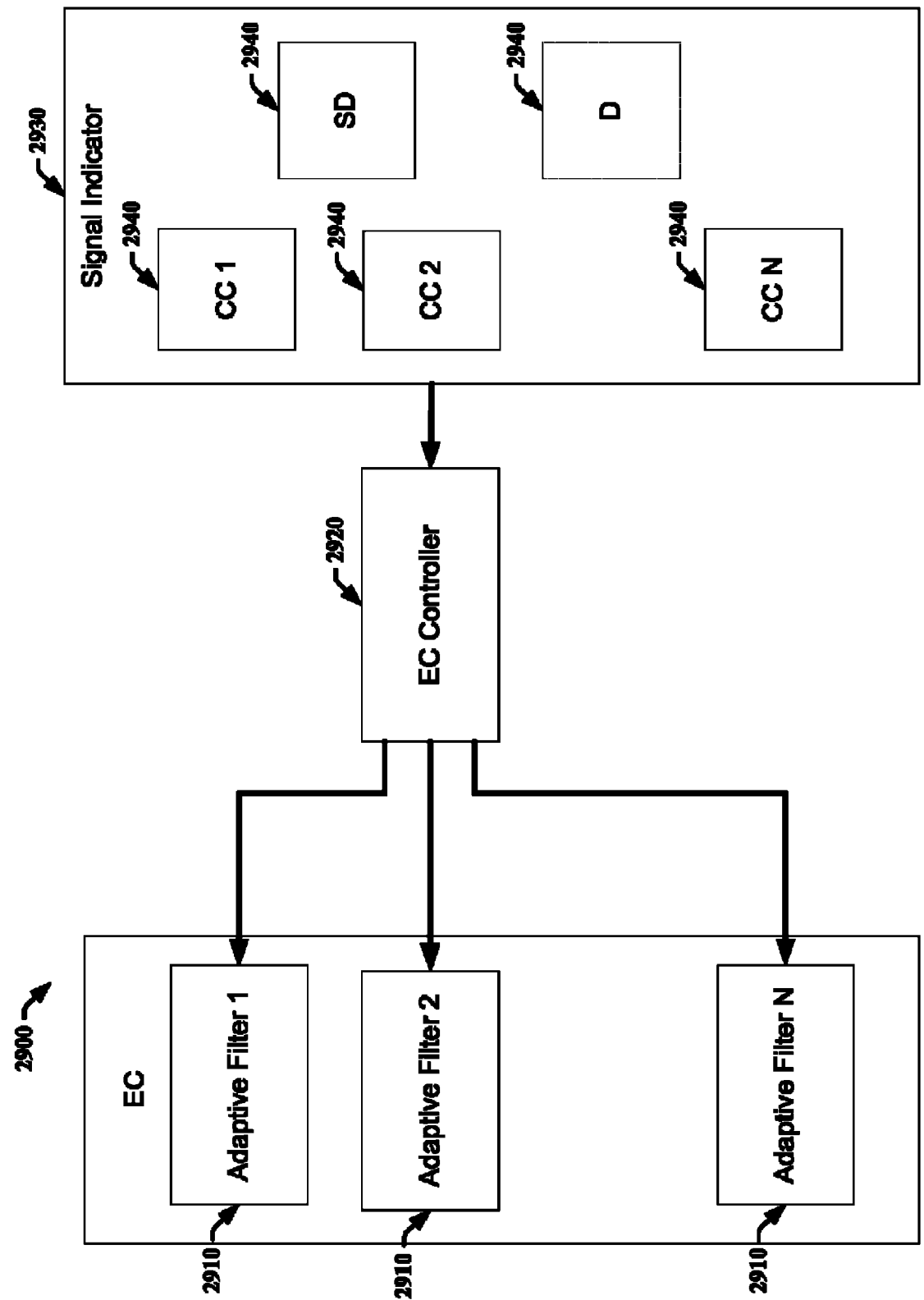

As shown in FIG. 24, one example of such a system 2400 can control a plurality of adaptive filters 2410 individually, for instance, if the EC controller 2420 is implemented at the frequency bin level (e.g., by receiving input from a signal indicator 2430 that has a plurality of components 2440 implemented at the frequency bin level). As shown in FIG. 25, the components 2540 of the signal indicator 2530 can include a cross-correlator (CC), a signal discriminator (SD) and optionally one or more detectors (D). As shown in FIGS. 26, 27 and 29, the EC controller 2620, 2720, 2920 can control all of the adaptive filters 2610, 2710, 2910 in the same manner (e.g., by using an overall decision statistic). As shown in FIG. 28, the signal indicator 2830 can include a plurality of cross correlators (CC), a single signal discriminator (SD) and optionally one or more detectors (D) (e.g., the cross-correlators being implemented at the frequency bin level and both the signal discriminator and the one or more detectors being implemented at the frame level). The CC, SD and the D(s) described above can be implemented by software or combinations of software and hardware and can be the same process executing on a single or a plurality of microprocessors or multiple processes executing on a single or a plurality of microprocessors.

Figure 30:
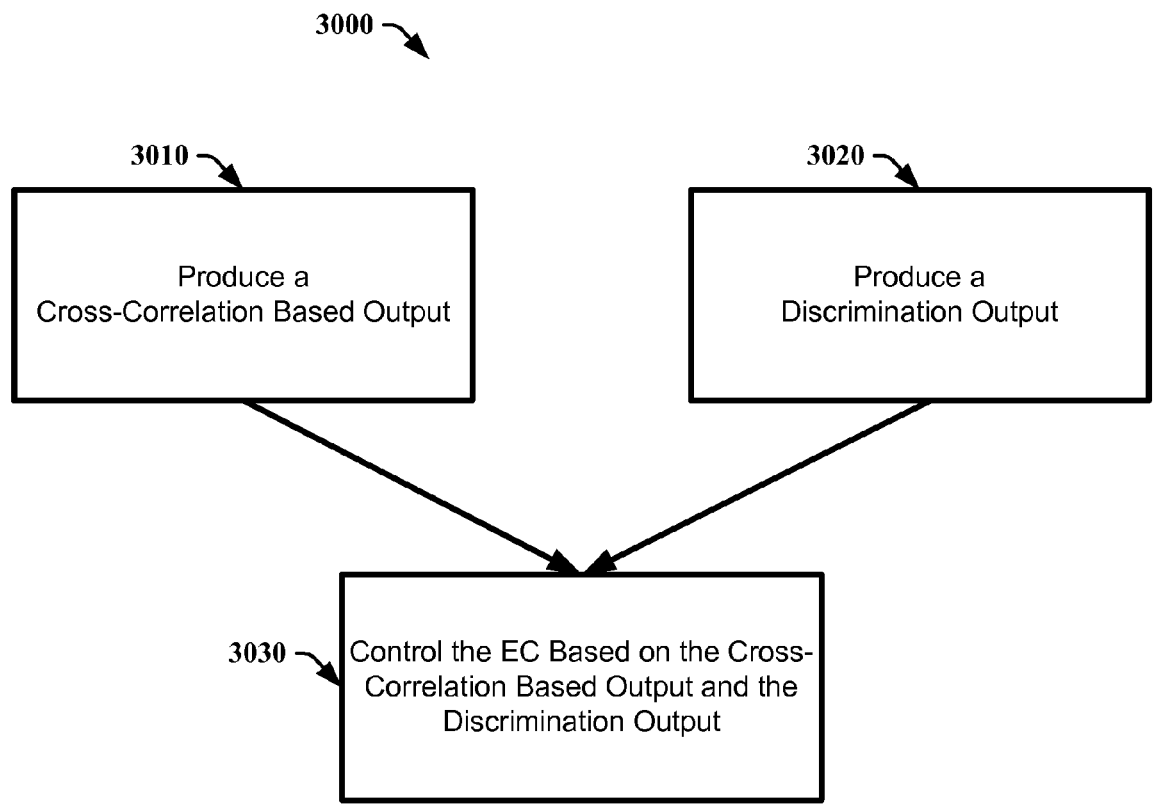
FIG. 30 is a flow diagram of another example of a method of controlling an EC.

FIG. 30 is a flow chart that illustrates one example of a method 3000 of controlling an echo canceller (EC). Such a method 3000 can be implemented by computer-executable instructions stored on one or more computer-readable media. At step 3010, a cross-correlation based output (CC) that indicates the presence of near-end signal (NES), the presence of echo only with echo-path change (EPC) or the presence of noise only (NO) in a corrupted signal is produced. At step 3020, a discrimination output (SD) that differentiates the presence of near-end signal (NES) from the presence of echo (ECHO) in the corrupted signal is produced. The echo canceller is controlled according to the cross-correlation based output and the discrimination output at step 3030.

The steps of the method 3000 can be performed in any suitable order, for instance, steps 3010 and 3020 can be performed in parallel or in sequence. The steps of the method 3000 can be performed in any suitable manner such as in the ways described above or below. For instance, the cross-correlation based output can be produced by computing a decision statistic such as the MECC or ECC decision statistics described above and the discrimination output can be produced using a real time recurrent learning network to yield a probability. The echo canceller can be controlled, for example, by comparing the decision statistic and the probability to their threshold and by using that information to make a decision regarding whether or not to prevent or allow the EC to adapt.

Figure 31:
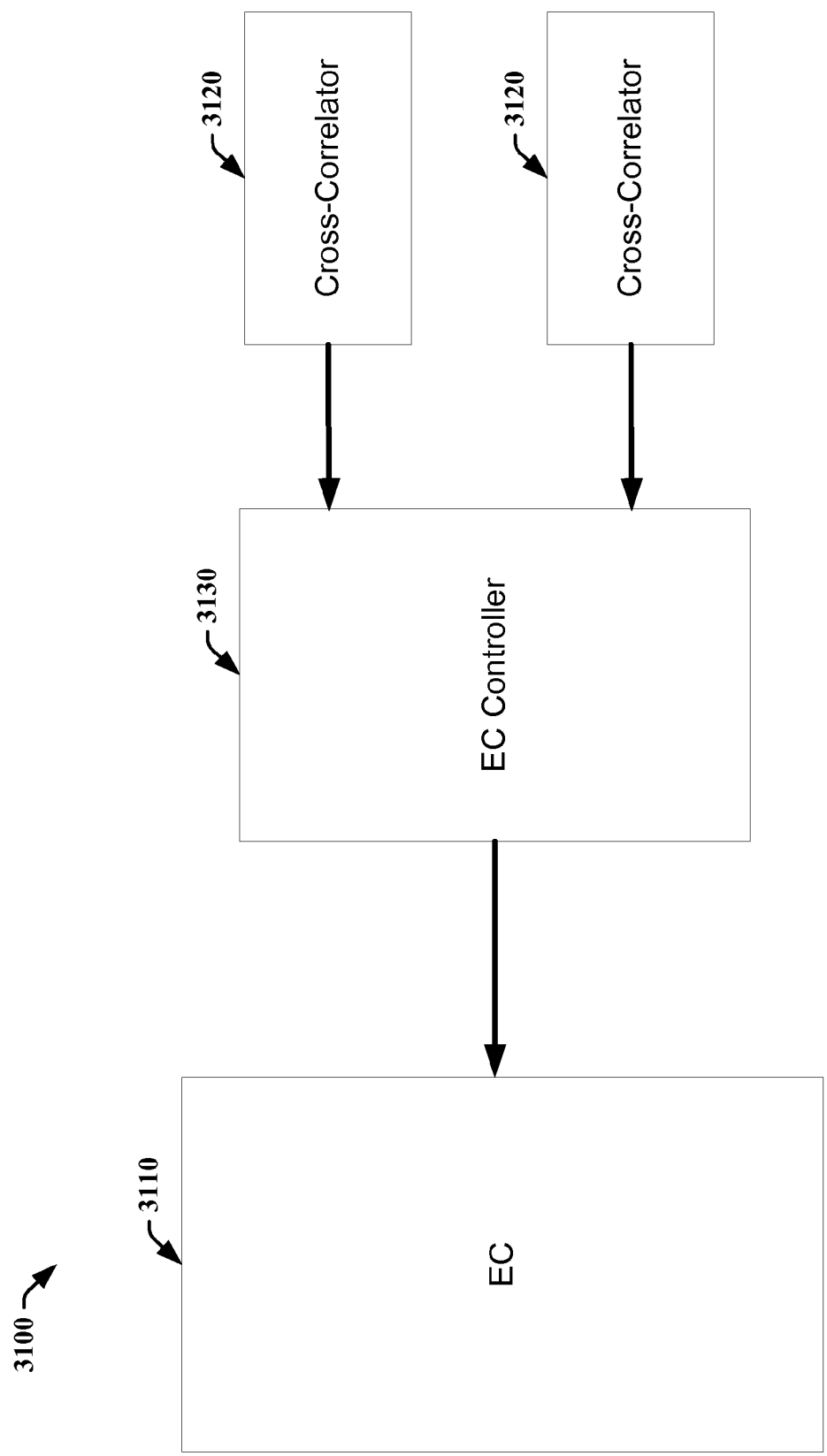
FIG. 31 is a block diagram of another example of a system for controlling an EC.

FIG. 31 is a block diagram of a system 3100 for controlling an echo canceller. The system 3100 can include two or more cross-correlators 3120 and an echo canceller controller 3130. The two or more cross-correlators 3120 each can be configured to detect one or more conditions in a corrupted signal based on a cross-correlation of two signals (e.g., the corrupted signal, the reference signal or the error signal) associated with the echo canceller. Any suitable combination of cross-correlators can be used in the system, such as the XMCC in combination with either the XECC, the MECC or the ECC. The echo canceller controller can be configured to control the echo canceller based on the conditions detected in the corrupted signal by the two or more cross-correlators including but not limited to detecting the presence of near-end signal, detecting the presence of echo only with echo-path change, detecting the presence of echo only without echo-path change, and detecting the presence of doubletalk.

Figure 32:
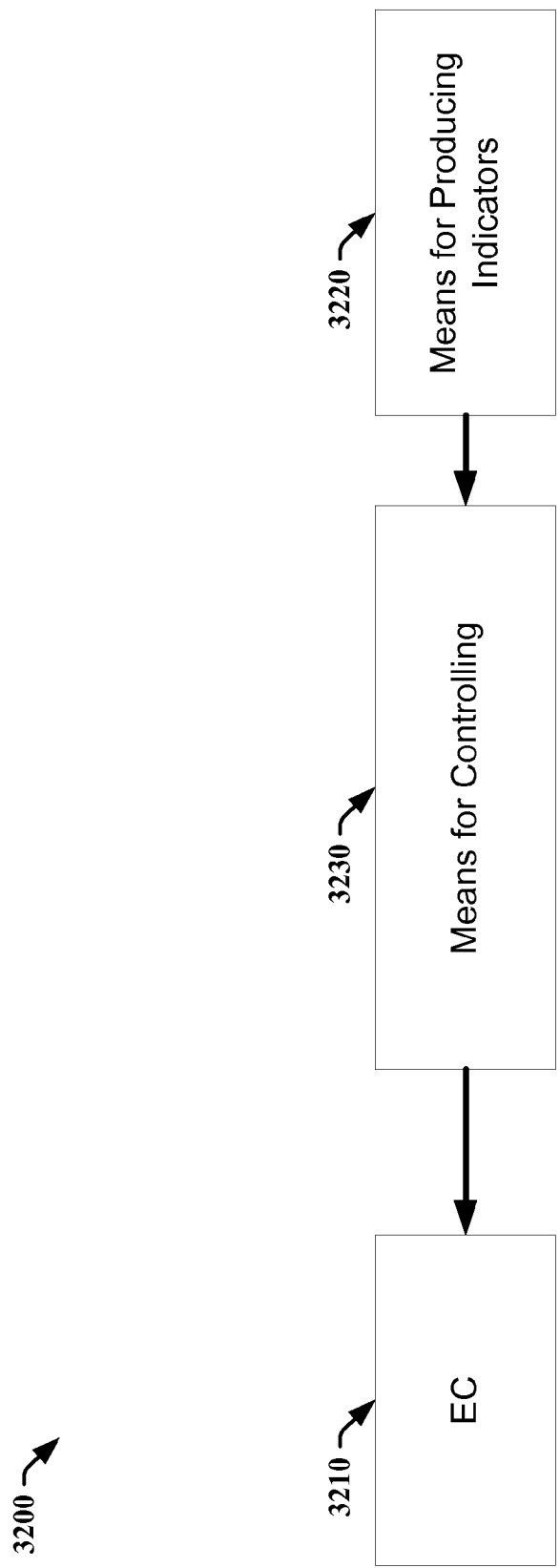
FIG. 32 is a block diagram of another example of a system for controlling an EC.

FIG. 32 is a block diagram of a system 3200 for controlling an echo canceller. The echo canceller 3210 is configured to receive a corrupted signal and a reference signal and to produce an error signal. The system 3200 includes means for producing indicators 3220 and means for controlling the echo canceller based on the indicators 3230. The indicators can include an echo only in the presence of echo-path change indicator, a near-end signal indicator, an echo only in the absence of echo-path change indicator and an absence of near-end signal in the absence of echo indicator. The echo only in the presence of echo-path change indicator can be produced based at least in part on cross-correlating two signals associated with the echo canceller 3210 in any suitable manner, such as the ways described above.

Figure 33:
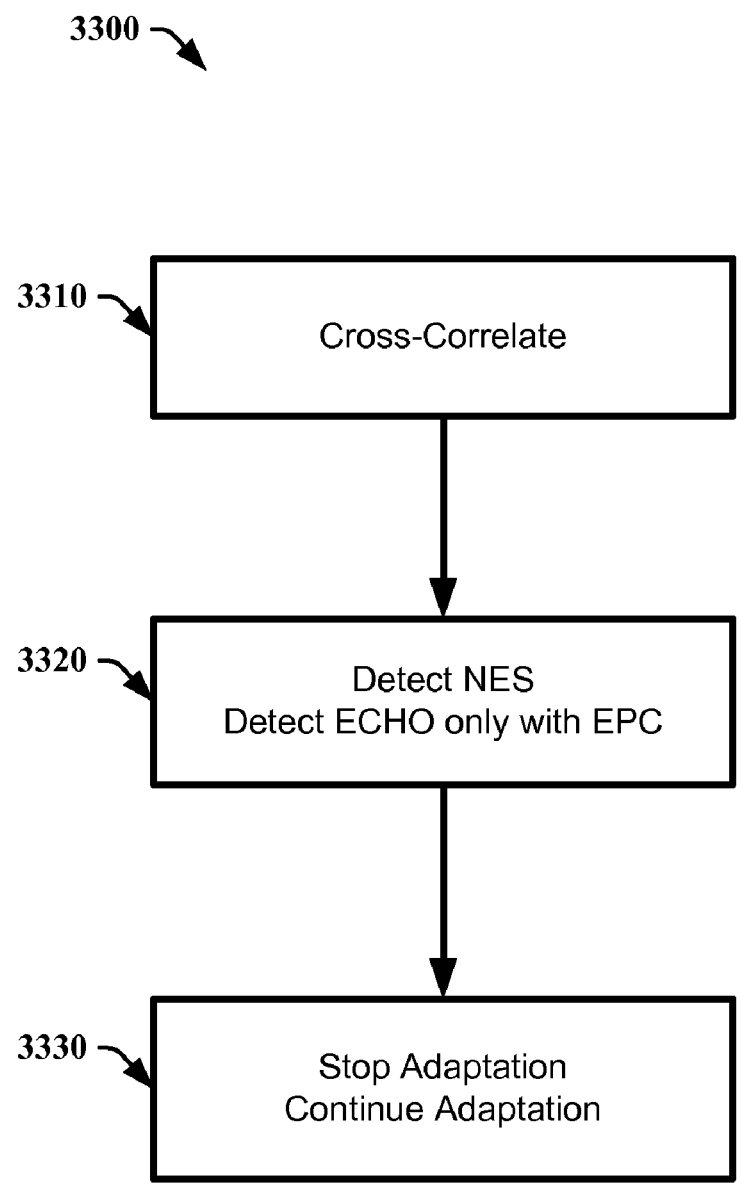
FIG. 33 is a flow diagram of another example of a method of controlling an EC.

FIG. 33 is a flow chart of a method 3300 of controlling an echo canceller. Such a method 3300 can be implemented by computer-executable instructions stored on one or more computer-readable media. At step 3310, two signals associated with the echo canceller (e.g., corrupted signal, reference signal, error signal) are cross-correlated to produce a cross-correlation result. At step 3320, if the presence of near-end signal in the corrupted signal is detected, adaptation of at least one of the echo canceller's one or more adaptive filters is stopped at step 3330. At step 3320, if the presence of echo-path change in the corrupted signal is detected in the absence of near-end signal, adaptation of at least one of the echo canceller's one or more adaptive filters is continued (e.g., continued at the same speed or accelerated) at step 3330. At step 3320, the method can further include detecting the absence of near-end signal and the absence of echo in the corrupted signal and/or detecting the presence of echo only without echo path change. If such conditions are detected, at step 3330, adaptation is halted in the former case or continued in the latter case.

The systems described above can be implemented in whole or in part by electromagnetic signals. These manufactured signals can be of any suitable type and can be conveyed on any type of network. For instance, the systems can be implemented by electronic signals propagating on electronic networks, such as the Internet. Wireless communications techniques and infrastructures also can be utilized to implement the systems.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with all computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

In regard to the various functions performed by the above described components, computer-executable instructions, means, systems and the like, the terms are intended to correspond, unless otherwise indicated, to any functional equivalents even though the functional equivalents are not structurally equivalent to the disclosed structures. To the extent that the terms "includes," and "including" and variants thereof are used in either the specification or the claims, these terms are intended to be inclusive in a manner the same as the term "comprising." Furthermore, any use of the conjunctions "or" and "and" are intended to be non-exclusive. Accordingly, the claimed subject matter is intended to embrace all such alterations, modifications, and variations that fall within the spirit and scope of the appended claims.

What is claimed is:

1. A system for controlling an echo canceller configured to remove echo from a corrupted signal, comprising:

a signal indicator configured to indicate periods of near-end signal and to indicate periods of echo only with echo-path change in the corrupted signal based at least in part on a cross-correlation between two signals associated with the echo canceller; and an echo canceller controller configured to control the echo canceller according to indications from the signal indicator, wherein the signal indicator comprises one or more signal discriminators configured to determine a relative influence of the near-end signal compared to the echo in the corrupted signal, wherein the echo canceller controller is configured to control the echo canceller according to indications from the signal indicator by preventing at least one of the echo canceller's one or more adaptive filters from adapting when the signal indicator indicates a period of near-end signal in the corrupted signal;

the signal indicator is further configured to indicate periods of no near-end signal and no echo and periods of echo only without echo-path change in the corrupted signal;

the echo canceller controller is configured to control the echo canceller according to the indications from the signal indicator by preventing at least one of the echo canceller's one or more adaptive filters from adapting when the signal indicator indicates a period of no near-end signal and no echo in the corrupted signal and by allowing at least one of the echo canceller's one or more adaptive filters to adapt when the signal indicator indicates a period of echo only without echo-path change or a period of echo only with echo-path change in the corrupted signal;

the signal indicator comprises one or more cross-correlators configured to cross-correlate the corrupted signal with the echo canceller's error signal, and one or more detectors configured to facilitate indicating periods of no echo and no near-end signal in the corrupted signal; and the one or more cross-correlators are implemented at a frequency bin level and the one or more signal discriminators comprise one signal discriminator configured at the frame level and the one or more detectors comprise one detector configured at the frame level.

2. The system of claim 1, wherein the echo canceller controller is configured to control the echo canceller according to the indications from the signal indicator by accelerating adaptation of at least one of the echo canceller's adaptive filters when the signal indicator indicates a period of echo only with echo-path change in the corrupted signal.

3. The system of claim 1, wherein the echo canceller controller is configured to control the echo canceller according to the indications from the signal indicator by switching to another echo canceller algorithm when the signal indicator indicates a period of echo only with echo-path change in the corrupted signal.

4. The system of claim 1, wherein the one or more signal discriminators and the one or more detectors are implemented by real time recurrent learning networks.

5. The system of claim 1, wherein the cross-correlation is between the corrupted signal and the echo canceller's error signal.

6. The system of claim 1, wherein the signal indicator comprises at least two cross-correlators that are configured to cross-correlate at least one different signal associated with the echo canceller.

7. The system of claim 6, wherein the signal indicator is implemented in the frequency domain.

8. The system of claim 1, wherein the echo canceller controller comprises an overall decision statistic.

9. A system for controlling an echo canceller configured to remove echo from a corrupted signal, comprising:

a signal indicator configured to indicate periods of near-end signal and to indicate periods of echo only with echo-path change in the corrupted signal based at least in part on a cross-correlation between two signals associated with the echo canceller, the signal indicator further configured to indicate periods of no near-end signal and no echo and periods of echo only without echo-path change in the corrupted signal, wherein the signal indicator comprises:

one or more signal discriminators configured to determine a relative influence of the near-end signal compared to the echo in the corrupted signal;

one or more detectors configured to facilitate indicating periods of no echo and no near-end signal in the corrupted signal;

one or more cross-correlators configured to cross-correlate the corrupted signal with the echo canceller's error signal, wherein the one or more signal discriminators and the one or more detectors are implemented by real time recurrent learning networks; and an echo canceller controller configured to control the echo canceller according to indications from the signal indicator by preventing at least one of the echo canceller's one or more adaptive filters from adapting when the signal indicator indicates a period of near-end signal in the corrupted signal;

preventing at least one of the echo canceller's one or more adaptive filters from adapting when the signal indicator indicates a period of no near-end signal and no echo in the corrupted signal; and allowing at least one of the echo canceller's one or more adaptive filters to adapt when the signal indicator indicates a period of echo only without echo-path change or a period of echo only with echo-path change in the corrupted signal.

10. The system of claim 9, wherein the echo canceller controller is further configured to control the echo canceller according to the indications from the signal indicator by accelerating adaptation of at least one of the echo canceller's adaptive filters when the signal indicator indicates a period of echo only with echo-path change in the corrupted signal.

11. The system of claim 9, wherein the echo canceller controller is further configured to control the echo canceller according to the indications from the signal indicator by switching to another echo canceller algorithm when the signal indicator indicates a period of echo only with echo-path change in the corrupted signal.

12. The system of claim 9, wherein the one or more cross-correlators is implemented at a frequency bin level and the one or more signal discriminators comprise one signal discriminator configured at the frame level and the one or more detectors comprise one detector configured at the frame level.

13. The system of claim 9, wherein the cross-correlation is between the corrupted signal and the echo canceller's error signal.

14. The system of claim 9, wherein the signal indicator comprises at least two cross-correlators that are configured to cross-correlate at least one different signal associated with the echo canceller.

15. The system of claim 14, wherein the signal indicator is implemented in the frequency domain.

16. The system of claim 9, wherein the echo canceller controller comprises an overall decision statistic.

17. A system for controlling an echo canceller configured to remove echo from a corrupted signal, comprising:

a signal indicator configured to indicate periods of near-end signal and to indicate periods of echo only with echo-path change in the corrupted signal based at least in part on a cross-correlation between two signals associated with the echo canceller, the signal indicator further configured to indicate periods of no near-end signal and no echo and periods of echo only without echo-path change in the corrupted signal, the signal indicator comprising:

one or more signal discriminators configured to determine a relative influence of the near-end signal compared to the echo in the corrupted signal, the one or more signal discriminators comprising one signal discriminator configured at the frame level;
one or more detectors configured to facilitate indicating periods of no echo and no near-end signal in the corrupted signal, the one or more detectors comprising one detector configured at the frame level; and
one or more cross-correlators configured to cross-correlate the corrupted signal with the echo canceller's error signal, the one or more cross-correlators being implemented at a frequency bin level, wherein the one or more signal discriminators and the one or more detectors being implemented by real time recurrent learning networks; and an echo canceller controller configured to control the echo canceller according to indications from the signal indicator by preventing at least one of the echo canceller's one or more adaptive filters from adapting when the signal indicator indicates a period of near-end signal in the corrupted signal;
preventing at least one of the echo canceller's one or more adaptive filters from adapting when the signal indicator indicates a period of no near-end signal and no echo in the corrupted signal; and
allowing at least one of the echo canceller's one or more adaptive filters to adapt when the signal indicator indicates a period of echo only without echo-path change or a period of echo only with echo-path change in the corrupted signal.

* * * * *